United States Patent
Sasano et al.

[11] Patent Number: 6,111,613
[45] Date of Patent: Aug. 29, 2000

[54] RECEIVER FOR TELEVISION MULTIPLEX BROADCASTING

[75] Inventors: Kouji Sasano; Takashi Tanaka, both of Tokyo, Japan

[73] Assignees: LSI Japan Co., Ltd.; Asahi National Broadcasting Co., Ltd., both of Tokyo, Japan

[21] Appl. No.: 09/053,297

[22] Filed: Apr. 1, 1998

[30] Foreign Application Priority Data

Dec. 21, 1995 [JP] Japan ................................. 7-350416
Dec. 24, 1996 [WO] WIPO ..................... PCT/JP96/03763

[51] Int. Cl.[7] ............................. H04N 7/00; H04N 7/08; H04N 5/44; H04J 1/00; H04B 7/204
[52] U.S. Cl. ........................ 348/468; 348/468; 348/473; 348/476; 348/487; 348/736; 348/737; 370/319; 370/344; 370/69.1; 375/260; 455/45
[58] Field of Search .................................. 348/473, 476, 348/487, 553, 552, 724, 729, 736, 737, 738, 480, 481, 482, 483, 484, 485, 486, 468; 455/45; 375/260; 370/319, 344, 69.1

[56] References Cited

U.S. PATENT DOCUMENTS

| | | | |
|---|---|---|---|
| 4,139,866 | 2/1979 | Wegner | 358/198 |
| 4,356,510 | 10/1982 | Nakayama | 358/143 |
| 5,070,404 | 12/1991 | Bullock et al. | 358/142 |
| 5,325,127 | 6/1994 | Dinsel | 348/473 |
| 5,428,404 | 6/1995 | Ingram et al. | 348/726 |
| 5,497,372 | 3/1996 | Nankoh et al. | 370/69.1 |
| 5,584,051 | 12/1996 | Goken | 455/45 |
| 5,722,047 | 2/1998 | Murayama | 455/45 |
| 5,857,149 | 1/1999 | Suzuki | 455/186.1 |

FOREIGN PATENT DOCUMENTS 6-122388 of 0000 Japan.
07336656 12/1995 Japan ............................ H04N 7/08

*Primary Examiner*—John K. Peng
*Assistant Examiner*—Paulos Natnael
*Attorney, Agent, or Firm*—Antonio R. Durando

[57] ABSTRACT

A receiver which receives two-channel multiplex broadcasting by using television sub audio. Two-channel data and/or facsimile data which are multiplexed on the broadcasting sub audio band of the television broadcasting wave including a video band, a main audio band and a sub audio band are displayed, printed and output. The receiver may have a device for displaying and printing data multiplexed on the sub audio band of the FM broadcasting wave, and further may have a device for displaying a television picture. The receiver may perform only one, some or all of the functions of displaying, printing and outputting multiplexed data.

37 Claims, 27 Drawing Sheets

RECEIVER FOR TELEVISION MULTIPLEX BROADCASTING

BACKGROUND OF THE INVENTION

1. Field of the Invention

The present invention relates to a receiver for receiving multiplexed data and multiplexed facsimile data broadcast in addition to sound multiplex broadcasting and teletext broadcasting, which have been so far broadcast multiplexed to the television broadcasting.

2. Description of the Related Art

In the so-called information-oriented era as we are today, attention is focused on data broadcasting for broadcasting digital data and also on facsimile broadcasting for broadcasting image data in addition to sound or picture, as broadcast so far.

The broadcasting as described above can be executed via dedicated media such as a broadcasting satellite. However, in order to effectively utilize radio wave resources, technical development work is positively concentrated on multiplex broadcasting which utilizes the radio wave of audio broadcasting or television broadcasting already in existence.

Like multiplex broadcasting, there are stereo broadcasting, sound multiplex broadcasting, teletext broadcasting, facsimile broadcasting and data broadcasting that utilize a broadcasting wave.

Among these type s of multiplex broadcasting, stereo broadcasting based on FM broadcasting waves and television broadcasting waves is now executed in practical application in Japan. Also, sound multiplex broadcasting and teletext broadcasting based on television broadcasting waves are also found in practical application. Facsimile broadcasting based on FM broadcasting waves is in practical application in the U.S.A., while broadcasting based on television broadcasting waves is under study in Japan. Data broadcasting based on FM broadcasting waves is now being practiced in Japan, and broadcasting based on television broadcasting waves is considered a subject for future study and development.

An example of multiplex broadcasting is given in particular using a television wave taken on the radio wave of NTSC color television broadcasting, which is now adopted in Japan and U.S.A.

As shown in FIG. 1, the radio wave of NTSC color television broadcasting comprises a video carrier with a bandwidth of 5.5 MHz (i.e., 4.25 MHz above the center frequency of the video carrier and 1.25 MHz below) and an audio carrier with a bandwidth of 0.5 MHz having the center frequency at 4.5 MHz above the video carrier (i.e., ±0.25 MHz). Thus, the total bandwidth is 6 MHz.

Among the types of multiplex broadcasting described above, in teletext broadcasting based on television broadcasting waves, data is transmitted in multiplex utilizing the vertical blanking interval in the television video signal contained in the video carrier. In FM stereo broadcasting, FM data broadcasting, FM facsimile broadcasting, television stereo broadcasting, television audio multiplex broadcasting and television facsimile broadcasting, programs are broadcast via sub-carrier in the audio band.

Following is a description of multiplex broadcasting based on sub-carrier according to a report of the Facsimile Broadcasting Committee of the Telecommunication Technical Council on television audio multiplex broadcasting and television facsimile broadcasting (Feb. 16, 1989). FIG. 2 shows a modulation spectrum according to such television multiplexed facsimile broadcasting system. In this figure, the audio carrier is represented on the abscissa axis (having horizontal scanning frequency; i.e., fH=525 lines×59.94, Hz/2=15.73425 KHz as a unit), and the deviation to the main carrier (having KHz as a unit) is represented on the ordinate axis.

In this multiplex broadcasting modulation spectrum, the center frequency of the main audio carrier is 0 fH, and the center frequency of the audio sub-carrier for sub audio, used for stereo and dual sound, is 2 fH. In this case, the deviation of the stereo sound is considered to be ±20 KHz, and the deviation of the dual sound is ±15 KHz. Also, the center frequency of the sub-carrier for the control signal to control the sub audio is at 3.5 fH.

The center frequency of the sub-carrier for analog facsimile is at 6 fH, and frequency range is from 4 fH to 8 fH. Because analog facsimile may impair sound multiplex broadcasting, it is not possible to multiplex the facsimile signal during sound multiplex broadcasting. For this reason, it is now attempted to have audio multiplex and analog facsimile at the same time by deleting the frequency range from 4 fH to 5 fH.

In contrast to analog facsimile, the center frequency of the sub-carrier for digital facsimile is at 4.5 fH, in view of impairment to sound multiplex broadcasting, and the operating frequency range is 1 fH (i.e., from 4 fH to 5 fH), and the frequency deviation of the main carrier is ±2 KHz. For the modulation system, Quadrature Phase Shift Keying (Quadrature PSK) is adopted.

FIG. 3 represents a block diagram of a conventional type television receiver, which receives TV stereo sound, TV dual sound and TV teletext data in addition to TV pictures. This television receiver comprises a TV tuner portion, a TV video processor portion and a TV audio processor portion. The TV tuner portion 2 is connected to a TV antenna 1. The TV video processor portion comprises a video detector 3 connected to the TV tuner 2, a signal separator 4 connected to the video detector 3, a video amplifier 5 and a teletext data demodulator 7, each connected to the signal separator 4, and a TV picture display unit 6, such as a cathode ray tube, which is switched over to the video amplifier 5 or to the teletext data demodulator 7.

The TV audio processor portion comprises a TV audio detector 8 connected to the TV tuner 2, a TV main/sub audio separator 9 connected to the TV audio detector 8, a TV sub audio demodulator 10 connected to the TV main/sub audio separator 9, a TV stereo matrix circuit 11 connected to the TV main/sub audio separator 9 and to the TV sub audio demodulator 10, a TV dual sound circuit 12 connected to the TV sub audio demodulator 10, and speakers 13 connected to the TV stereo matrix circuit 11 and to the TV dual sound circuit 12.

When a TV signal is received by the TV antenna 1, the video signal and audio signal are tuned and selected by the TV tuner 2. The video signal thus selected is detected by the video detector 3 and is further separated into a synchronization signal and a video signal at the signal separator 4. The video signal is displayed on the TV picture display unit 6 via the video amplifier 5. The teletext data multiplexed on the synchronization signal is picked up from the separated synchronization signal and is demodulated at the teletext data demodulator 7. Further, it is converted to the video signal and is displayed on the TV picture display unit 6.

On the other hand, the TV audio signal is also detected by the TV audio detector 8 and is separated into a main audio signal and a sub audio signal at the TV main/sub audio separator 9. In case the sub audio is a TV stereo sound, the stereo sound is picked up from the main audio signal and the sub audio signal demodulated at the TV sub audio demodulator 10 by the TV stereo matrix circuit 11. In case the demodulated sub audio is a TV dual sound, the sub audio signal demodulated at the TV sub audio demodulator 10 is picked up via the TV dual sound circuit 12. These audio signals are then converted to sound via the speakers 13.

FIG. 4 represents a block diagram of a conventional type television receiver for receiving TV multiplexed facsimile data signals in addition to stereo sound, dual sound and teletext data signals, together with pictures. This television receiver comprises a TV tuner, a TV video processor, and a TV audio/multiplexed-facsimile-data processor.

Among these component elements, the arrangement and the operation of the TV tuner and the TV video processor, as well as the arrangement and the operation for processing TV stereo sound and TV dual sound, are the same as the arrangement and the operation of the television receiver shown in FIG. 3; therefore, a detailed description is not repeated here. In addition, a first band-pass filter 14, allowing a first sub-carrier of 4.5 fH to pass, is connected to the TV audio detector 8. A TV multiplexed facsimile data demodulator 15 is connected to the first band-pass filter 14, and a TV multiplexed facsimile data printer 16 is connected to the TV multiplexed facsimile data demodulator 15.

The first sub-carrier of 4.5 fH multiplexed on the TV audio signal is selected by the first band-pass filter 14 as it passes through. The first sub-carrier selected by the first band-pass filter 14 is sent to the TV multiplexed facsimile data demodulator 15. The TV multiplexed facsimile data sent from the first sub-carrier is demodulated at the TV multiplexed facsimile data demodulator 15 and the TV multiplexed facsimile data thus demodulated is printed by the TV multiplexed facsimile printer 16.

FIG. 5 shows a block diagram of a conventional type receiver for receiving FM multiplexed facsimile data together with stereo audio of FM broadcasting. The receiver comprises an FM tuner, and an FM audio/multiplexed-facsimile-data processor.

The FM tuner comprises an FM tuner 18 connected to an FM antenna 17. The FM audio/multiplexed-facsimile-data processor comprises an FM detector 19 connected to the FM tuner 18, an FM main/sub audio separator 20 connected to the FM detector 19, an FM sub audio demodulator 21 connected to the FM main/sub audio separator 20, an FM stereo matrix circuit 22 connected to the FM main/sub audio separator 20 and to the FM sub audio demodulator 21, and the speakers 13 connected to the FM stereo matrix circuit 22. Further, a third band-pass filter 23 allowing sub-carrier for FM facsimile data to pass is connected to the FM detector 19. An FM multiplexed facsimile data demodulator 24 is connected to the third band-pass filter 23, and an FM multiplexed facsimile data printer 25 is connected to the FM multiplexed facsimile data demodulator 24.

In this receiver, the FM broadcasting signal received by the FM antenna 17 is tuned and selected by the FM tuner 18. The audio signal thus tuned and selected is detected by the FM detector 19 and is separated into a main audio signal and a sub audio signal at the FM main/sub audio separator 20. From the main audio signal and the sub audio signal, the stereo audio is picked up by the FM stereo matrix circuit 22, and these audio signals are converted to sound by the speakers 13.

The sub-carrier for the FM facsimile data multiplexed on the FM audio signal is selected by the third band-pass filter 23 as it passes through. The sub-carrier for FM facsimile data selected by the third band-pass filter 23 is sent to the FM multiplexed facsimile data demodulator 24. The FM multiplexed facsimile data is demodulated from the sub-carrier thus sent at the FM multiplexed facsimile data demodulator 24, and the demodulated facsimile data is printed by the FM multiplexed facsimile printer 25.

FIG. 6 shows a block diagram of a conventional type receiver for receiving FM multiplexed data broadcast together with stereo sound of FM broadcasting. This receiver comprises an FM tuner and an FM audio/multiplexed-data processor.

Among these component elements, the arrangement and the operation of the FM tuner and the processing of FM stereo sound are the same as those of the receiver shown in FIG. 5, and a detailed description is not given here. In addition, a fourth band-pass filter 26 allowing the sub-carrier for FM data to pass is connected to the FM detector 19. An FM multiplexed data demodulator 27 is connected to the fourth band-pass filter 26, and an FM multiplexed data display unit 28 is connected to the FM multiplexed data demodulator 27.

The sub-carrier for FM data multiplexed on audio signal is selected by the fourth band-pass filter 26 as it passes through. The sub-carrier for FM data selected by the fourth band-pass filter 26 is sent to the FM multiplexed data demodulator 27. The FM multiplexed data is demodulated from the sub-carrier at the FM multiplexed data demodulator 27, and the demodulated FM multiplexed data is displayed on the FM multiplexed data display unit 28.

It is noted that data broadcast utilizing the FM broadcasting wave as described above is now being used in practical application, and that data broadcast utilizing the television broadcasting wave is under study for future application.

The center frequency of the sub-carrier in multiplexed facsimile broadcasting using the television wave, being scheduled for practical application, is at 4.5 fH. The operating frequency bandwidth is to be 1 fH (i.e., from 4 fH to 5 fH), the frequency deviation of the main carrier is to be ±2 KHz, and Quadrature Phase Shift Keying (Quadrature PSK) is to be adopted for demodulation.

In addition, it has also been attempted to have the center frequency of the sub-carrier at 7.5 fH. However, it is considered that the video signal may be impaired, although there is not much hindrance to audio multiplexed broadcasting. For this reason, only one program may be broadcast in multiplex broadcasting, which can be multiplexed in addition to stereo broadcasting and audio multiplex broadcasting, as practiced so far for multiplex broadcasting utilizing the sub audio of television, and it is not possible to multiplex two-channel facsimile broadcasting, two-channel data broadcasting or one-channel facsimile broadcasting and data broadcasting.

Also, there exists an analog facsimile system in which the center frequency of the sub-carrier is at 6 fH and the frequency bandwidth is set from 4 fH to 8 fH. However, this analog facsimile may impair sound multiplex broadcasting, and it is not possible to multiplex the facsimile signal during the audio multiplex broadcasting. For this reason, it has been attempted to use audio multiplexing and analog facsimile at the same time by deleting the frequency bandwidth from 4 fH to 5 fH, but this is not yet practically applied.

Because digital facsimile signals consist of binary data as in the case of digital data signals, the digital data signal can be handled in the same manner as the digital facsimile signal. Data broadcasting using a sub-carrier of 4.5 fH of digital facsimile broadcasting multiplexed on television audio bandwidth is described in "A Proposal to Broadcast a Data Broadcast by use of Multiple Broadcasting System," by Kouji Sasano (Broadcasting System, 31st Conference of Commercial Broadcasting Engineering, pp.22–23, Japan Commercial Broadcasting Federation, Nov. 9, 1994). The setting of the frequency deviation of data signal sub-carrier to ±2 KHz and ±3 KHz is shown in "A Report for the Addition of a Third Subcarrier in the TV Audio," by Kouji Sasano (ITE '94: ITE Annual Convention, pp.359–360, Institute of Television Engineers, Jul. 29, 1994).

In cases where the center frequency of the sub-carrier is set to 7.5 fH, it has been considered that the video signal may be impaired, while there is less impairment to sound multiplex broadcasting. The present inventors have performed various types of experiments on these problems and found that no impairment occurs to the video signal in cases where digital modulation is performed with a sub-carrier of center frequency 7.5 fH in a Quadrature Phase Shift Keying system with a frequency deviation of the main carrier of ±2 to 3 KHz. Based on this finding, in a prior application, Japanese Patent Application No. 6-122388, the present inventors proposed a television multiplex broadcasting system in which a sub-carrier of 7.5 fH is modulated by facsimile or data digital signal with Quadrature PSK system.

According to the above multiplex broadcasting system, it is possible to carry out two-channel multiplex broadcasting by simultaneously executing multiplex broadcasting using a sub-carrier of 4.5 fH. This is also described in "The Measurements of the Interference on the over all TV Signal from a Digital Signal and a Third Subcarrier in the Audio Portion of the TV Signal," by Kouji Sasano (Broadcasting System, 31st Conference of Commercial Broadcasting Engineering, pp.26–27, Japan Commercial Broadcasting Federation, Nov. 9, 1994).

In the television multiplexed digital broadcasting system, consideration is given to impairment to sound multiplex broadcasting and impairment to video signal, and the frequency deviation of the sub-carrier with center frequency at 7.5 fH is set to ±2 to 3 KHz. For this reason, no special problem occurs when a program of television digital multiplex broadcasting, which is a data program, is received by a television receiver fixed at a place where an electric field strength of a certain degree is assured. However, in the case of a mobile receiver, such as the receiver on an automobile, that is at a place where sufficient electric field strength is not assured and where it is not possible to have an electric field with stabilized strength, and thus, because bit error rate and page error rate caused by crashing of eye pattern increase, it is very difficult to receive the multiplexed data program, as described in "TV Audio MPX-Data-Broadcast and Mobile Reception," by Kouji Sasano and Akeshi Kondo (ITE Technical Report, Institute of Television Engineers, Aug. 24, 1995).

In view of the above facts, the present inventors have performed receiving experiments under various conditions of television multiplex broadcasting and found that no impairment occurs to sound multiplex broadcasting or video signal if the frequency deviation of the data multiplex sub-carrier with center frequency at 7.5 fH is within ±30 KHz, and that stabilized data reception can be assured even under conditions when it is not possible to receive multiplex data programs because sufficient electric field strength cannot be assured or electric field with stable strength cannot be maintained, as in the case of a mobile receiver such as one on an automobile.

Further, it was discovered that no problem occurs in cases where the frequency deviation is set to ±20 KHz, and even when it is extended to ±30 KHz there is no practical problem, although there may be some impairment.

The present inventors have performed various types of experiments on multiplex broadcasting utilizing sub audio of television and confirmed that no impairment occurs to video signal when multi-valued digital modulation, such as Quadrature PSK system with a frequency deviation of the main carrier of ±30 KHz, is performed to the sub-carrier, even in cases when a sub-carrier with a center frequency of 7.5 fH is used.

BRIEF SUMMARY OF THE INVENTION

In the present application, it is proposed to provide a receiver for a multiplex broadcasting system wherein a sub-carrier of 7.5 fH is modulated with a multi-valued digital system on a digital facsimile or a digital data signal.

Further, it is proposed to provide a receiver in which the received digital data signal is not only displayed or printed, but is also transferred to a device such as a personal computer, a word processor, etc., which can process the digital data.

In this case, by simultaneously executing multiplex broadcasting using a sub-carrier of 4.5 fH, it is possible to carry out two-channel digital multiplex broadcasting.

Also, by broadcasting each of the channels in the two-channel digital multiplex broadcasting, it is possible to perform one channel each of data broadcasting and facsimile broadcasting in addition to two-channel data broadcasting or two-channel facsimile broadcasting.

The embodiments of the invention of the present application have a form of a television set, which can receive television pictures, or a form of a radio set, which cannot receive television pictures.

In the case of an embodiment in the form of a radio set, it is also possible to display or print only programs of digital data broadcasting or digital facsimile broadcasting without reproducing the sound.

Further, the multiplexed broadcast data is sent to a data processing device such as a personal computer, word processor, display phone, etc. without turning the data into pictures using a display unit and the like, and it is displayed without change by the display mechanism of the data processing device, or is processed after editing it.

DESCRIPTION OF THE PREFERRED EMBODIMENTS OF THE INVENTION

In explaining the embodiments of the present invention, the description will be first directed to a two-channel multiplex broadcasting system utilizing a television broadcasting wave.

Figure 7:
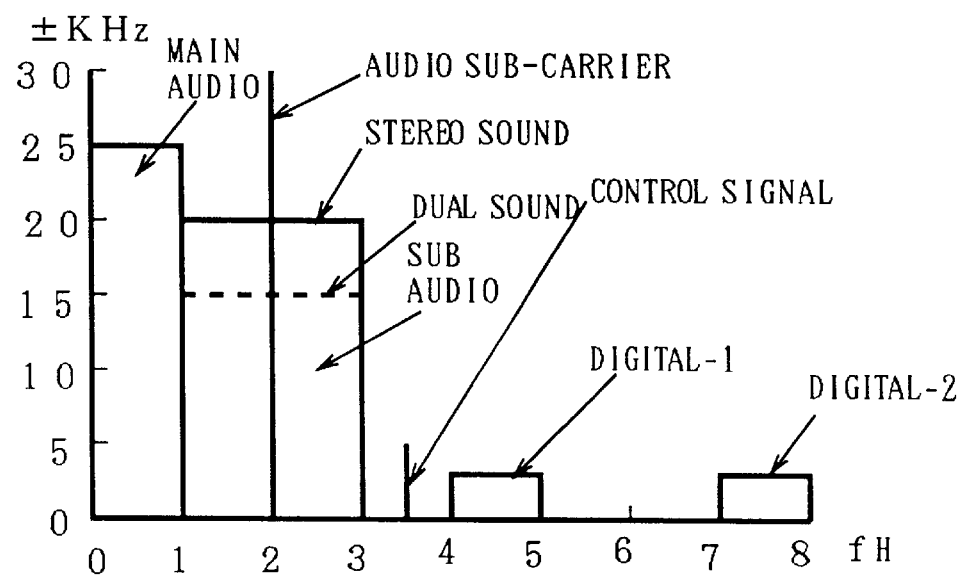
FIG. 7 is a diagram of a modulation spectrum of a television multiplex broadcast used in the present invention based on the NTSC broadcasting system.

FIG. 7 represents a modulation spectrum in which multi-valued digital modulation, such as a Quadrature PSK system with a frequency deviation of the main carrier within ±2 KHz, is performed using a sub-carrier with a center frequency of 4.5 fH and a sub-carrier with a center frequency of 7.5 fH in a two-channel multiplex broadcasting system utilizing a television broadcasting wave. In this figure, the audio carrier is represented on the axis of the abscissa using horizontal scanning frequency (fH=525 lines×59.94, Hz/2=15.73425 KHz as a unit). The deviation to main carrier is represented on the ordinate axis using KHz as a unit.

In this multiplex broadcasting modulation spectrum, the center frequency of the main audio carrier is 0 fH, and the center frequency of the audio sub-carrier for sub audio (i.e. for stereo and dual sound) is 2 fH. In this case, the deviation of the stereo sound is 20 KHz, and the deviation of the dual sound is 15 KHz. The center frequency of the sub-carrier for the control signal for controlling the sub audio is at 3.5 fH.

The center frequency of a first sub-carrier (digital-1) to multiplex the signal is at 4.5 fH, and the operating frequency bandwidth is 1 fH (i.e., from 4 fH to 5 fH). The center frequency of a second sub-carrier (digital-2) is at 7.5 fH, and its operating frequency bandwidth is 1 fH (i.e., from 7 fH to 8 fH). Multiplexing of the signal is performed with multi-valued digital modulation, such as Quadrature PSK, and the frequency deviation of the main carrier is ±2 KHz.

Figure 8:
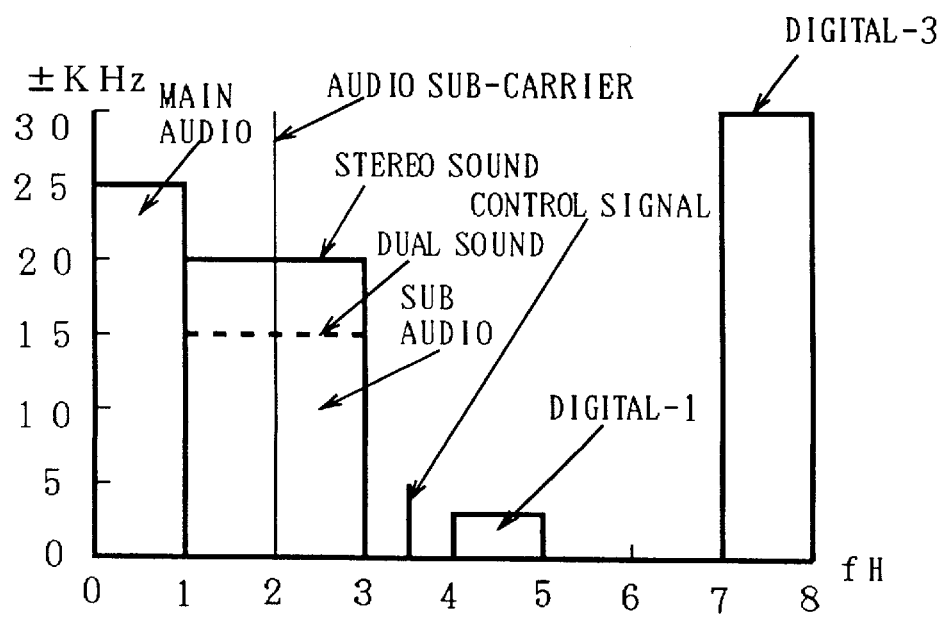
FIG. 8 is a diagram of another modulation spectrum of a television multiplex broadcast used in the present invention based on the NTSC broadcasting system.

FIG. 8 shows a modulation spectrum in which a sub-carrier with a center frequency of 4.5 fH is implemented in a multi-valued digital modulation system such as Quadrature PSK with a frequency deviation of the main carrier of ±2 KHz in a two-channel multiplex broadcasting system utilizing the television broadcasting wave; and a sub-carrier with a center frequency of 7.5 fH is implemented in a multi-valued digital modulation system such as Quadrature PSK with a frequency deviation of the main carrier of ±30 KHz.

Similar to the modulation spectrum shown in FIG. 7, the center frequency of the main audio carrier in this multiplex broadcasting modulation spectrum is 0 fH, and the center frequency of the audio sub-carrier for sub audio (i.e. for stereo and dual sound) is 2 fH. In this case, the deviation of stereo sound is 20 KHz, and the deviation of dual sound is 15 KHz. The center frequency of the sub-carrier for the control signal to control the sub audio is at 3.5 fH.

The center frequency of a first sub-carrier (digital-1) to multiplex the signal is at 4.5 fH, and the operating frequency bandwidth is 1 fH (i.e., from 4 fH to 5 fH). The center frequency of a second sub-carrier (digital-3) is at 7.5 fH, and the operating frequency bandwidth is 1 fH (i.e., from 7 fH to 8 fH). Multiplexing of the signal is performed with multi-valued digital modulation, such as Quadrature PSK, and the frequency deviation of the main carrier is ±30 KHz.

There is no special restriction to the combination of signals to be broadcast in this multiplex broadcasting system, so long as they are signals for which digital modulation can be performed. Typical examples that can be handled are character data and facsimile data and, in addition, binary data such as computer programs, picture data other than facsimile data, or digital audio data.

Several embodiments of the present invention are described below with reference to accompanying drawings. First, a description will be given of a television receiver for receiving a TV multiplexed facsimile data signal and/or a TV multiplexed data signal in addition to stereo sound, dual sound and teletext data signals together with pictures.

Figure 4:
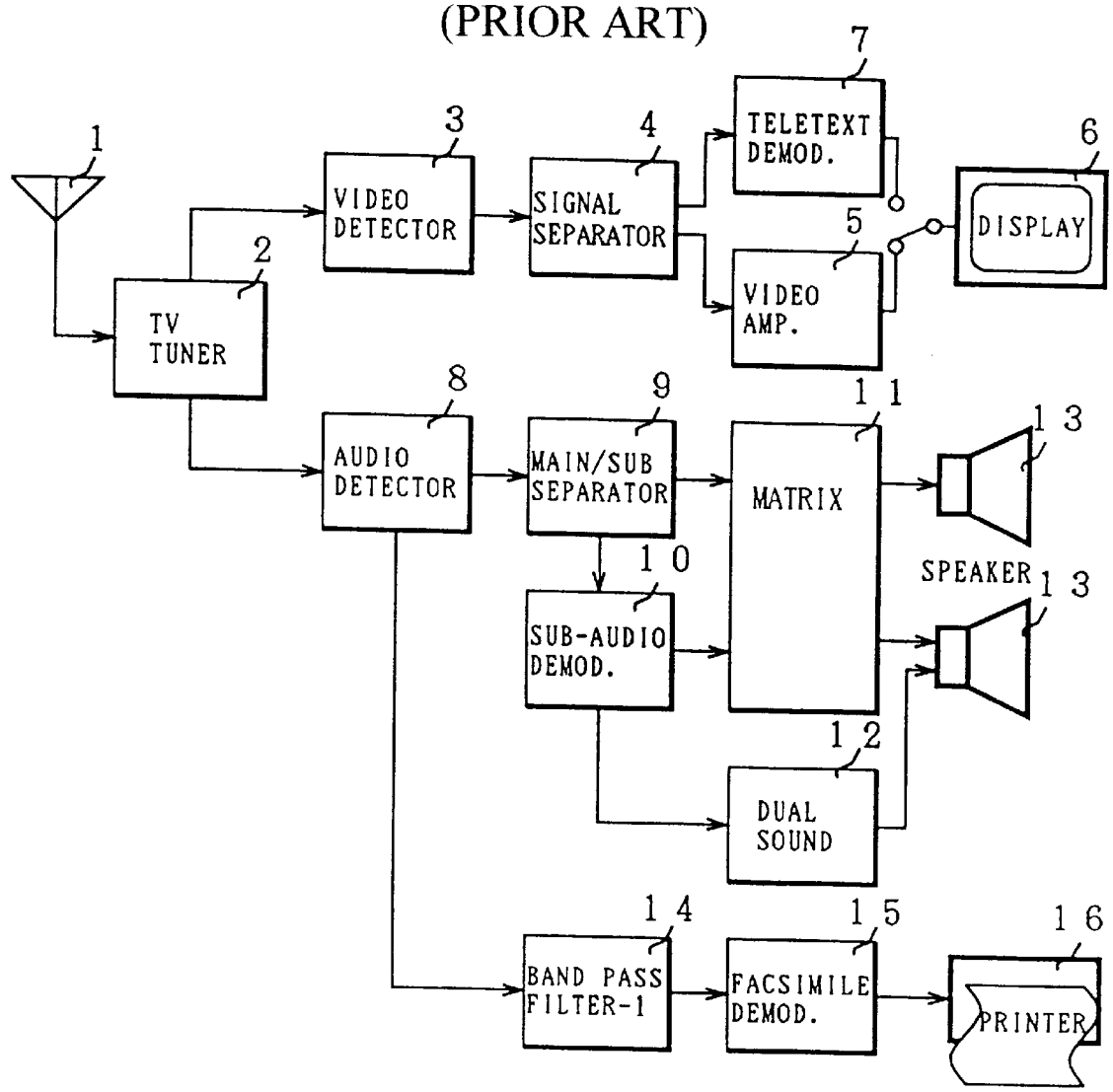
FIG. 4 is a block diagram of a conventional type television multiplexed facsimile receiver.
Figure 9:
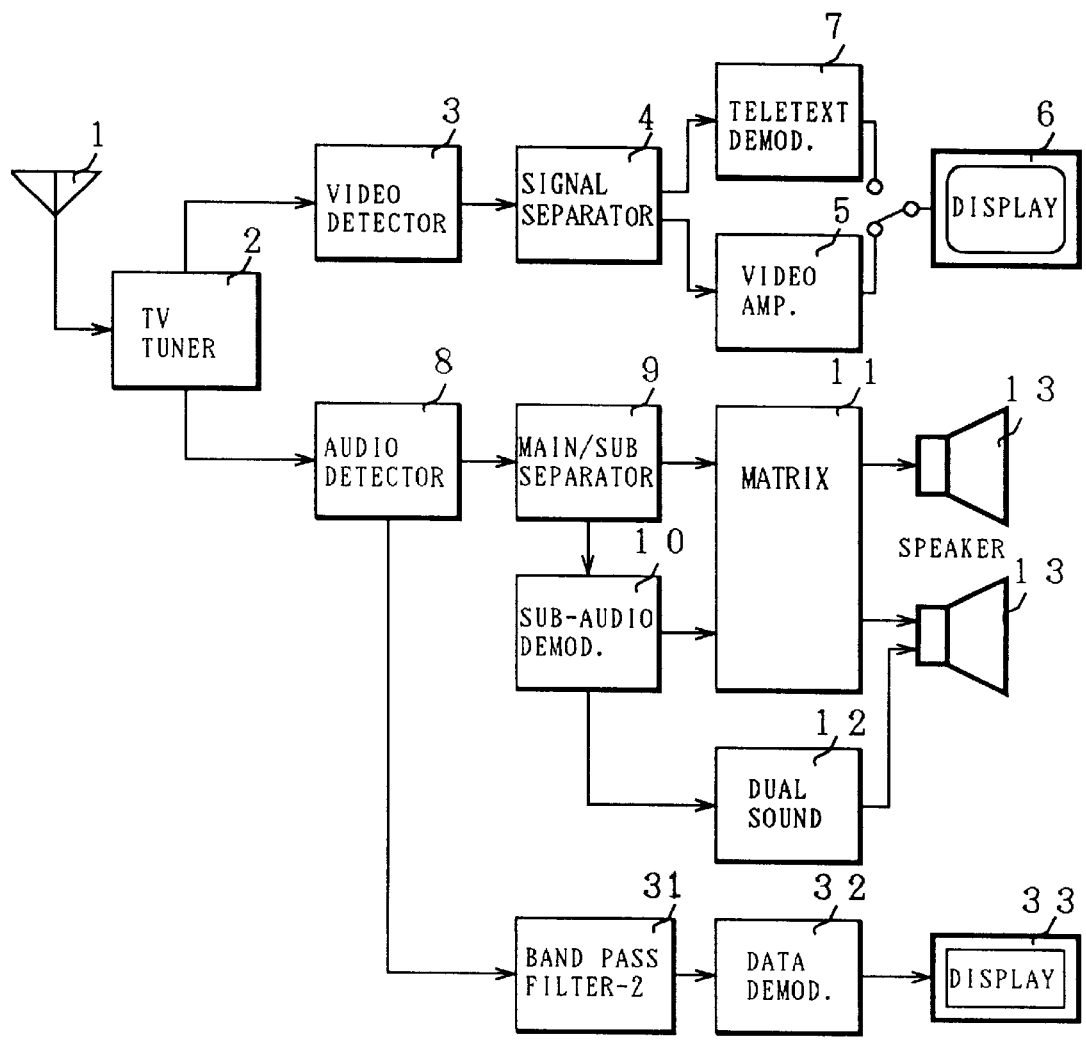
FIG. 9 is a block diagram of a television receiver of an embodiment of the present invention for receiving one-channel multiplexed data.

FIG. 9 represents a block diagram of a television receiver for receiving TV multiplexed data which is multiplexed using a first sub-carrier of 4.5 fH and a second sub-carrier of 7.5 fH in addition to TV stereo sound, TV dual sound and TV teletext data together with TV pictures. This television receiver is provided with functions to demodulate and display TV multiplexed data multiplexed using the second sub-carrier of 7.5 fH instead of the conventional functions to demodulate and print facsimile signals multiplexed using the first sub-carrier of 4.5 fH, as shown in FIG. 4.

The television receiver comprises a TV tuner, a TV video processor, and a TV audio/multiplexed-data processor. Among these component elements, the arrangement and the operation of the TV tuner and the TV video processor, as well as the arrangement and the operation for processing TV stereo sound and TV dual sound, are the same as those of the conventional television receiver shown in FIG. 3, and a detailed description is not given here.

A second band-pass filter 31, allowing the second sub-carrier of 7.5 fH to pass, is connected to the TV audio detector 8. A TV multiplexed data demodulator 32 is connected to the second band-pass filter 31, and a TV multiplexed data display unit 33 is connected to the TV multiplexed data demodulator 32. A printer to print the TV multiplexed data may be used instead of or together with the TV multiplexed data display unit 33.

When the television signal is received by the TV antenna 1, the video signal and audio signal are tuned and selected by the tuner 2. The video signal thus tuned and selected is detected by the video detector 3 and it is further separated to a synchronization signal and a video signal at the signal separator 4, and the video signal is displayed on a display unit 6 via a video amplifier 5.

The teletext signal multiplexed on the synchronization signal is picked up from the separated synchronization signal and it is demodulated at the teletext demodulator 7; it is further converted to a video signal and displayed on the display unit 6.

A second sub-carrier of 7.5 fH multiplexed on the TV audio signal is selected by the second band-pass filter 31 as it passes through and the second sub-carrier selected by the second band-pass filter 31 is sent to the TV multiplexed data demodulator 32. At the TV multiplexed data demodulator 32, the TV multiplexed data is demodulated from the second sub-carrier and the demodulated TV multiplexed data is displayed on the TV multiplexed data display unit 33.

Figure 10:
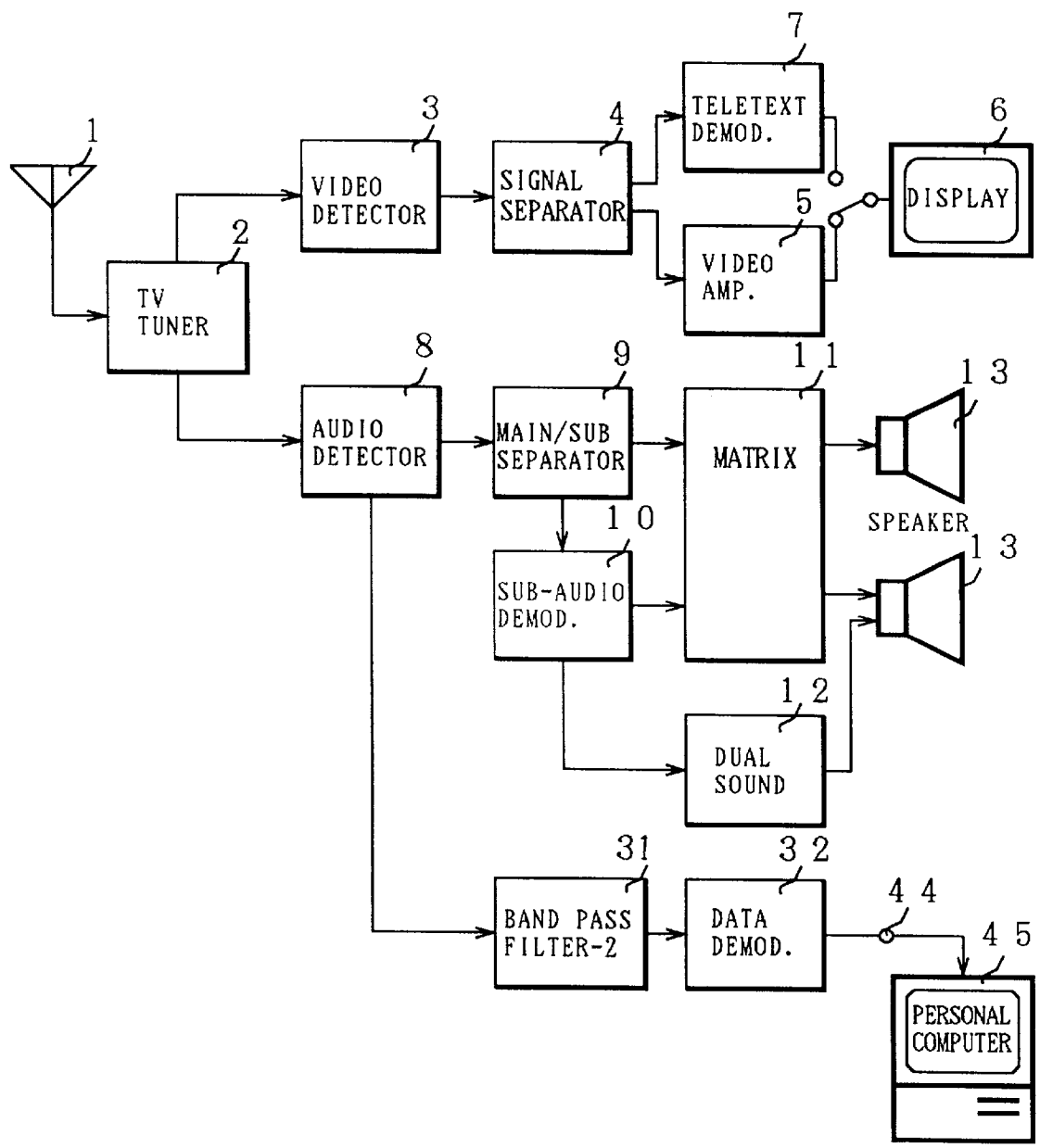
FIG. 10 is a block diagram of a television receiver of an embodiment of the present invention for outputting one-channel multiplexed data to a data processing device.

In the television receiver shown in FIG. 9, the received TV multiplexed data is displayed on a TV multiplexed data display unit. In contrast, the television receiver shown in FIG. 10 is designed in such manner that the received TV multiplexed data can be outputted to a data processing device such as a personal computer. Therefore, in case the television receiver shown in FIG. 10 is used, it is possible to store the received multiplexed data and to utilize the data again, or to edit the received multiplexed data, when necessary.

The basic arrangement of this television receiver is the same as that of the television receiver shown in FIG. 9. Thus, a description of the common arrangement and components is not given here, but only differences will be explained. The TV multiplexed data demodulator 32 is connected to the second band-pass filter 31 of the television receiver. A connection terminal 44 is provided on the TV multiplexed data demodulator 32 instead of the TV multiplexed data display unit 33 provided in the television receiver of FIG. 9, and a personal computer 45 is connected to this connection terminal 44. The personal computer 45 as shown here is given only as an example, and another data processing device, such as PDA (personal digital assistant), electronic notebook, word processor, etc., may be connected.

Figure 11:
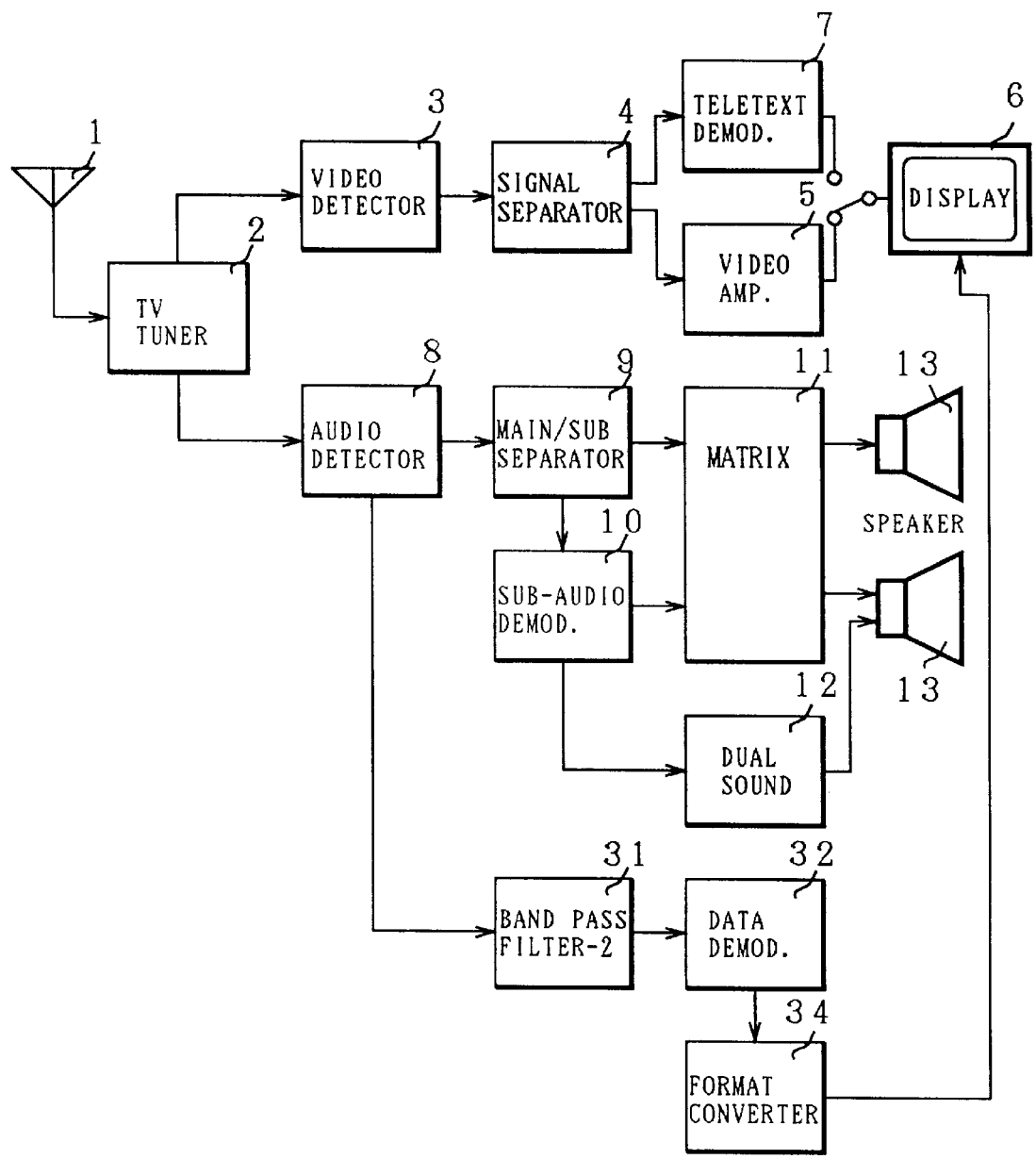
FIG. 11 is a block diagram of a television receiver of another embodiment of the present invention for receiving one-channel multiplexed data.

FIG. 11 represents another block diagram of a television receiver for receiving TV multiplexed data multiplexed using a first sub-carrier of 4.5 fH and a second sub-carrier of 7.5 fH as shown in FIGS. 7 and 8, in addition to TV stereo sound, TV dual sound and TV teletext data, together with TV pictures. In this television receiver, TV multiplexed data is not displayed on the TV multiplexed data display unit 33 of the television receiver for receiving TV multiplexed data, as shown in FIG. 9, but the multiplexed data is displayed on a TV picture display unit such as a cathode ray tube for displaying television pictures. This television receiver, like the television receiver shown in FIG. 9, comprises a TV tuner, a TV video processor and a TV audio/multiplexed-data processor. However, unlike the television receiver of FIG. 9, the TV multiplexed data demodulator 32 is connected to a TV format converter 34 instead of the TV multiplexed data display unit 33. In this TV format converter 34, TV multiplexed data is converted to a format which can be displayed by the cathode ray tube, and it is displayed on the TV picture display unit 6, either alone or synthesized with the television picture or teletext picture. Because the other arrangement is common to both, a detailed description is not given here.

Figure 12:
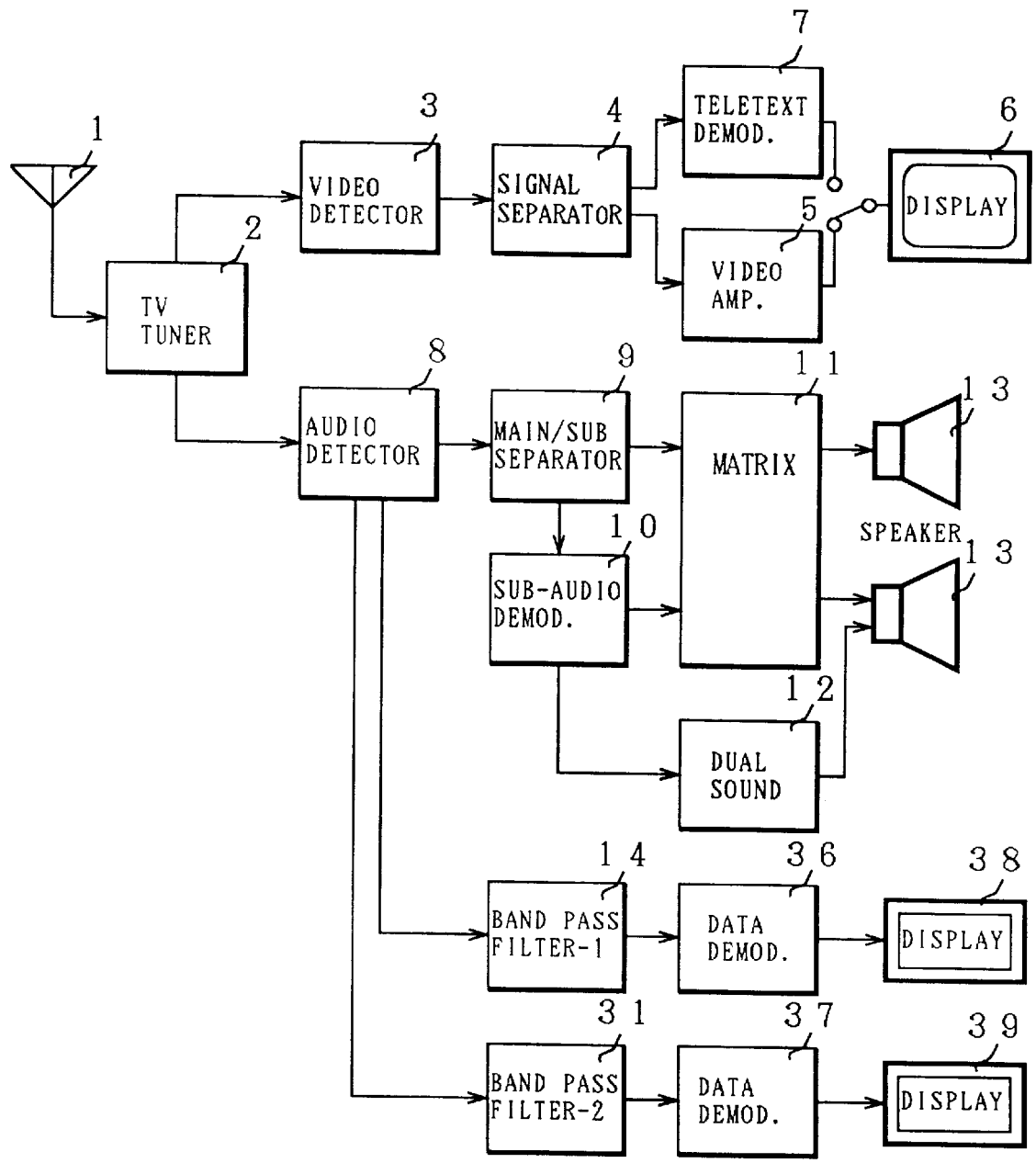
FIG. 12 is a block diagram of a television receiver of an embodiment of the present invention for receiving two-channel TV multiplexed data.

FIG. 12 represents a block diagram of a television receiver for receiving a two-channel TV multiplexed data signal using the first sub-carrier of 4.5 fH and the second sub-carrier of 7.5 fH shown in FIGS. 7 and 8, in addition to TV stereo sound, TV dual sound and TV teletext data together with TV pictures. This television receiver is provided with functions to demodulate and display one-channel TV multiplexed data using the second sub-carrier of 7.5 fH shown in FIG. 10 and, in addition, with functions to demodulate and display one more channel of TV multiplexed data using the first sub-carrier of 4.5 fH. This television receiver comprises a TV tuner, a TV video processor, and a TV audio/multiplexed-signal processor.

Figure 1:
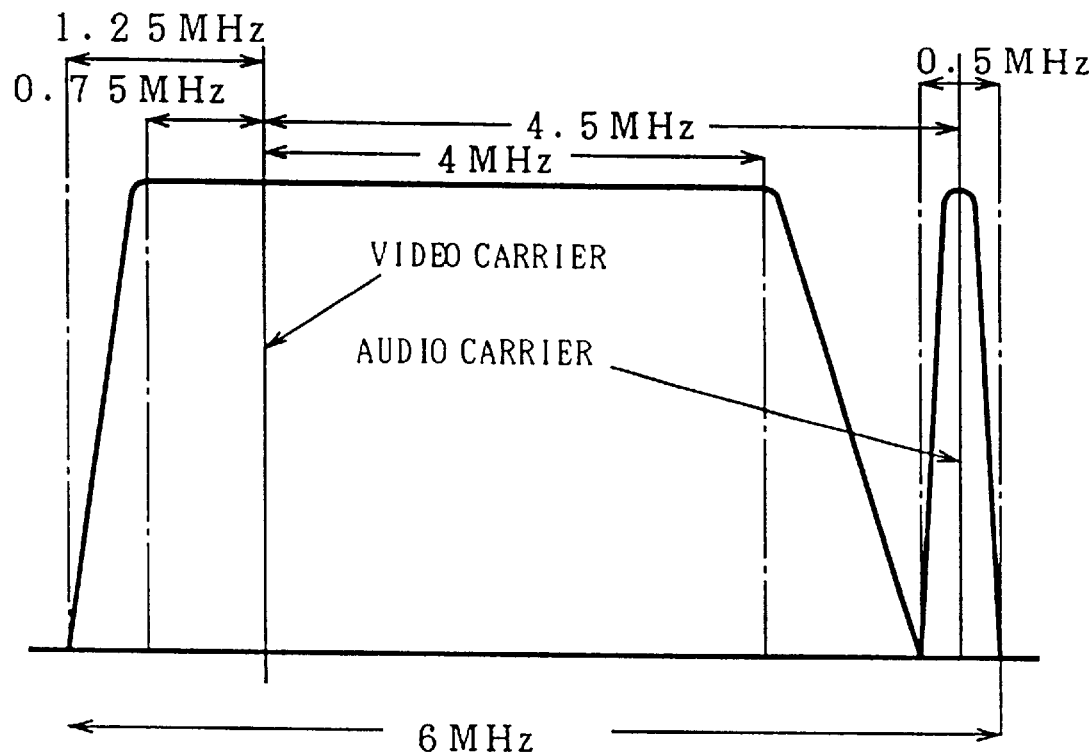
FIG. 1 is a standard diagram of radio waves for NTSC color television broadcasting.
Figure 2:
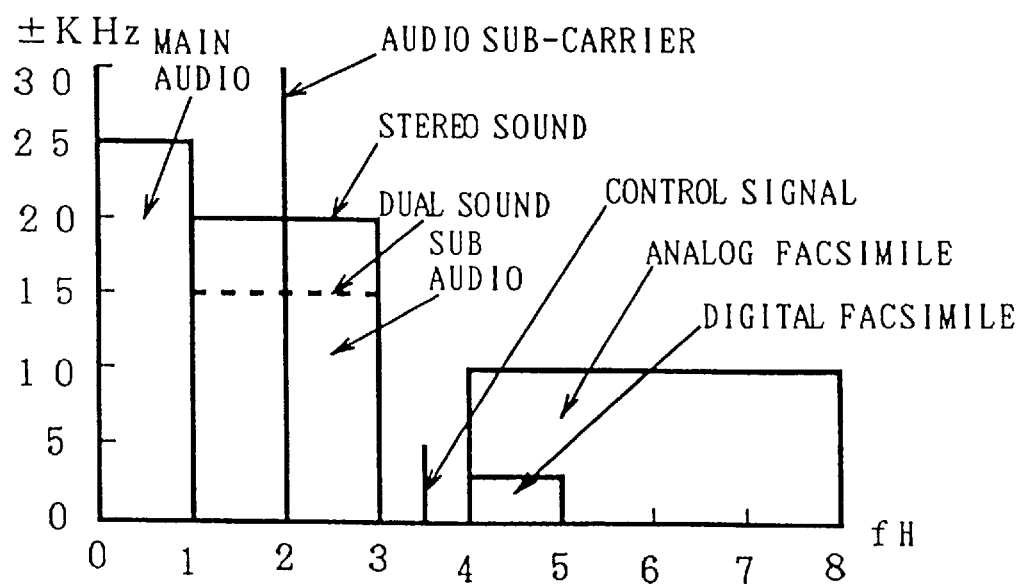
FIG. 2 is a diagram of a modulation spectrum of a television multiplex broadcast facsimile based on the NTSC system.
Figure 3:
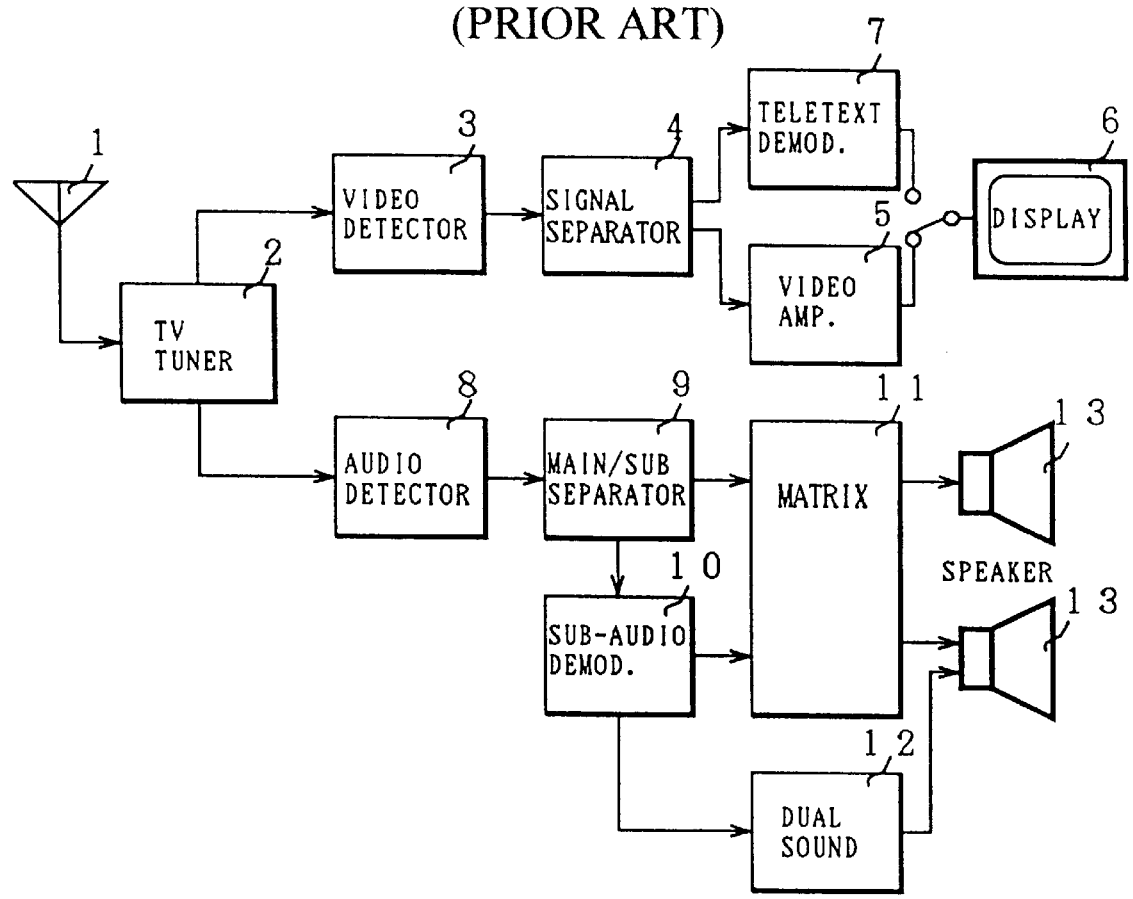
FIG. 3 is a block diagram of a conventional type television receiver.

Among these component elements, the arrangement and the operation of the TV tuner and the TV video processor, as well as the arrangement and the operation to process TV stereo sound and TV dual sound, are the same as those of the conventional type television receiver shown in FIG. 3, and a detailed description is not given here.

A first band-pass filter 14 allowing the first sub-carrier of 4.5 fH to pass and a second band-pass filter 31 allowing the second sub-carrier of 7.5 fH to pass are connected to the TV audio detector 8. A first TV multiplexed data demodulator 36 is connected to the first band-pass filter 14, a second TV multiplexed data demodulator 37 is connected to the second band-pass filter 31, a TV multiplexed data display unit 38 is connected to the first TV multiplexed data demodulator 36, and a TV multiplexed data display unit 39 is connected to the second TV multiplexed data demodulator 37. Instead of the two TV multiplexed data display units 38 and 39, a single TV multiplexed data display unit may be used, and this TV multiplexed data display unit may be connected by switching over to the first multiplexed data demodulator 36 or the second multiplexed data demodulator 37, or it may be connected to both and display both at the same time. Also, a printer to print the TV multiplexed data may be used instead of or together with the TV multiplexed data display units 38 and 39.

The first sub-carrier of 4.5 fH multiplexed on the TV audio signal is selected by the first band-pass filter 14 as it passes through and the first sub-carrier selected by the first band-pass filter 14 is sent to the first TV multiplexed data demodulator 36. TV multiplexed data is demodulated from the first sub-carrier sent through at the first TV multiplexed data demodulator 36, and the demodulated TV multiplexed data is displayed on the first TV multiplexed data display unit 38. Also, the second sub-carrier of 7.5 fH multiplexed on the TV audio signal is selected by the second band-pass filter 21 as it passes through and the second sub-carrier selected by the second band-pass filter 31 is sent to the second TV multiplexed data demodulator 37. TV multiplexed data is demodulated from the second sub-carrier sent through at the second TV multiplexed data demodulator 37, and the demodulated TV multiplexed data is displayed on the second TV multiplexed data display unit 39.

Figure 13:
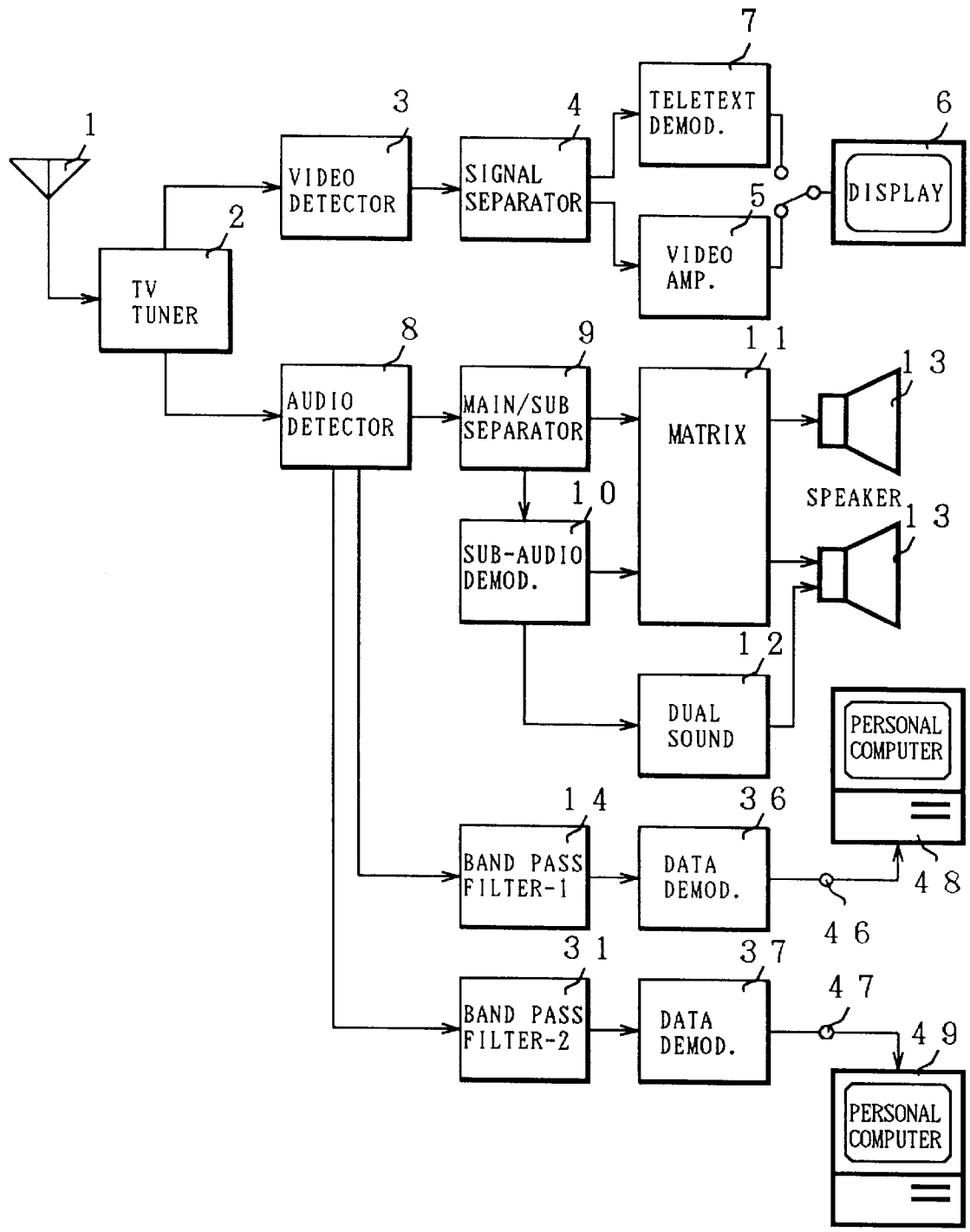
FIG. 13 is a block diagram of a television receiver of an embodiment of the present invention for outputting two-channel TV multiplexed data to a data processing device.

In the television receiver shown in FIG. 12, two-channel TV multiplexed data is displayed on the TV multiplexed data display units 38 and 39. In contrast, the television receiver shown in FIG. 13 is designed in such manner that the received two-channel TV multiplexed data can be outputted to a data processing device such as a personal computer. Therefore, in case the television receiver of FIG. 13 is used, it is possible to store the received multiplexed data and to utilize it again, or to edit the received multiplexed data, when necessary.

The basic arrangement of this television receiver is the same as that of the television receiver of FIG. 12, and a description is not given here for what is common, but only differences will be described. Specifically, a first TV multiplexed data demodulator 36 is connected to the first band-pass filter 14 of this television receiver, and the first TV multiplexed data demodulator 36 is provided with a connection terminal 46 instead of the first TV multiplexed data display unit 38 of FIG. 12, and a personal computer 48 is connected to the connection terminal 46. Also, a second TV multiplexed data demodulator 37 is connected to the second band-pass filter 31, and the second TV multiplexed data demodulator 37 is provided with a connection terminal 47 instead of the second TV multiplexed data display unit 39 of FIG. 12, and a personal computer 49 is connected to the connection terminal 47.

The personal computers 48 and 49 shown here are given only as examples and another device, such as PDA (personal digital assistant), electronic notebook, word processor, and the like, which can process data, may be connected.

Figure 14:
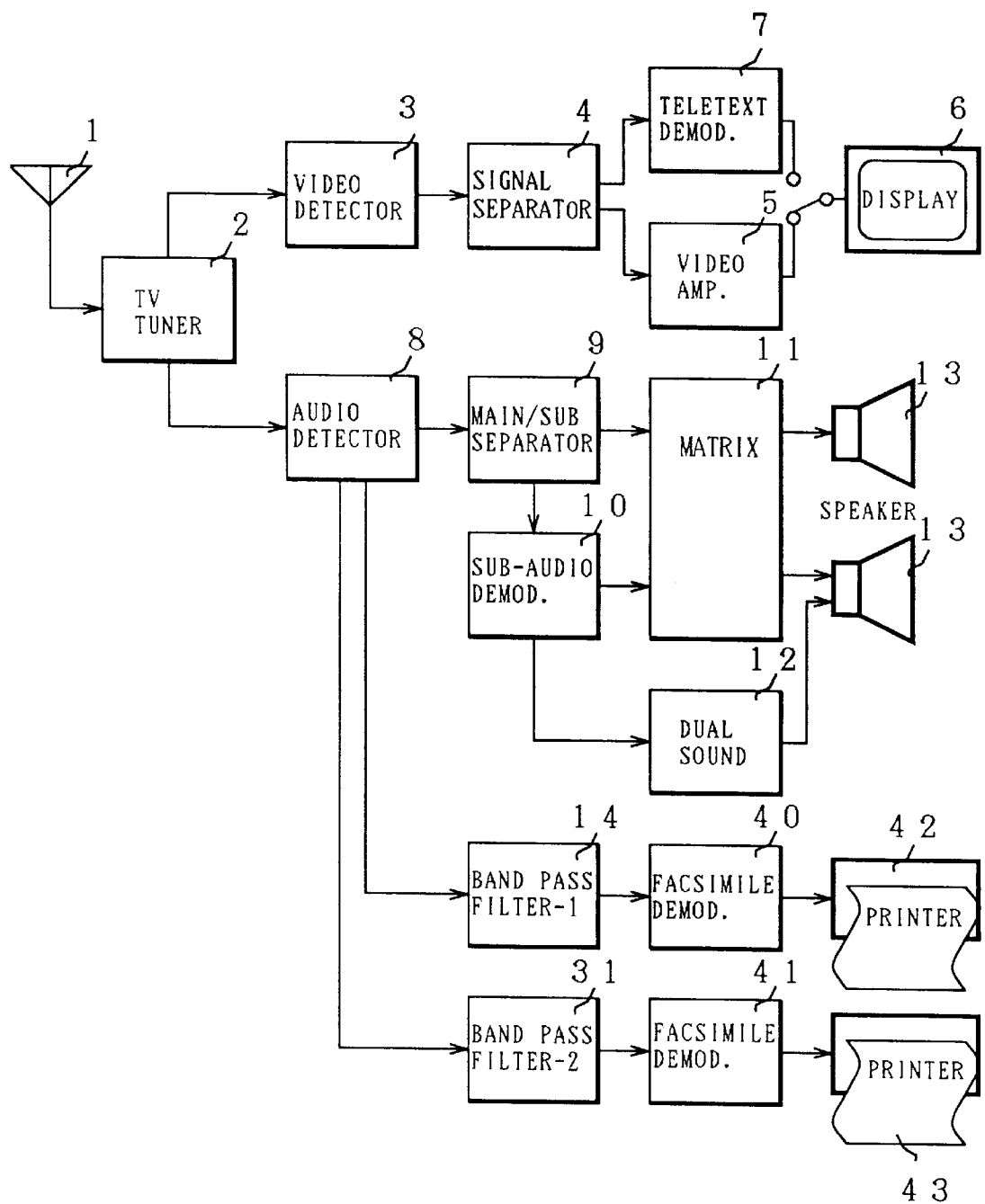
FIG. 14 is a block diagram of a television receiver of an embodiment of the present invention for receiving two-channel TV multiplexed facsimile.

FIG. 14 represents a block diagram of a television receiver for receiving two-channel TV multiplexed facsimile data using the first sub-carrier of 4.5 fH and the second sub-carrier of 7.5 fH shown in FIGS. 7 and 8, in addition to TV stereo sound, TV dual sound and TV teletext data together with TV pictures. This television receiver is provided with functions to demodulate and display two-channel TV multiplexed facsimile data using the first sub-carrier of 4.5 fH and the second sub-carrier of 7.5 fH as shown in FIG. 12, instead of functions to demodulate and display two-channel TV multiplexed data using the first sub-carrier of 4.5 fH and the second sub-carrier of 7.5 fH. This television receiver comprises a TV tuner, a TV picture processor and a TV audio/multiplexed-signal processor.

Among the component elements, the arrangement and the operation of the TV tuner and the TV video processor as well as the arrangement and the operation to process TV stereo sound and TV dual sound are the same as those of the conventional type television receiver shown in FIG. 3, and a detailed description is not given here.

A first band-pass filter 14 allowing the first sub-carrier of 4.5 fH to pass and a second band-pass filter 31 allowing the second sub-carrier of 7.5 fH to pass are connected to the TV audio detector 8. A first TV multiplexed facsimile data demodulator 40 is connected to the first band-pass filter 14, a second TV multiplexed facsimile data demodulator 41 is connected to the second band-pass filter 31, a TV multiplexed facsimile data printer 42 is connected to the first TV multiplexed facsimile data demodulator 40, and a TV multiplexed data display unit 43 is connected to the second TV multiplexed data demodulator 41.

Instead of the two TV multiplexed facsimile data printers 42 and 43, a single TV multiplexed facsimile data printer may be used, and this TV multiplexed facsimile data printer may be switched over and connected to the first TV multiplexed facsimile data demodulator 40 or the second multiplexed facsimile data demodulator 41. Also, a display unit for displaying TV multiplexed facsimile data may be used instead of or together with the TV multiplexed facsimile data printers 42 or 43.

The first sub-carrier of 4.5 fH multiplexed on the TV audio signal is selected by the first band-pass filter 14 as it passes through and the first sub-carrier selected by the first band-pass filter 14 is sent to the first TV multiplexed facsimile data demodulator 40. TV multiplexed facsimile data is demodulated from the first sub-carrier at the first TV multiplexed facsimile data demodulator 40, and the demodulated TV multiplexed facsimile data is printed by the TV multiplexed facsimile data printer 42.

The second sub-carrier of 7.5 fH multiplexed on the TV audio signal is selected by the second band-pass filter 31 as it passes through and the second sub-carrier selected by the second band-pass filter 31 is sent to the second TV multiplexed facsimile data demodulator 41. The TV multiplexed facsimile data is demodulated from the second sub-carrier at the second TV multiplexed facsimile data demodulator 41, and the demodulated TV multiplexed facsimile data is printed by the TV multiplexed facsimile data printer 43.

Figure 15:
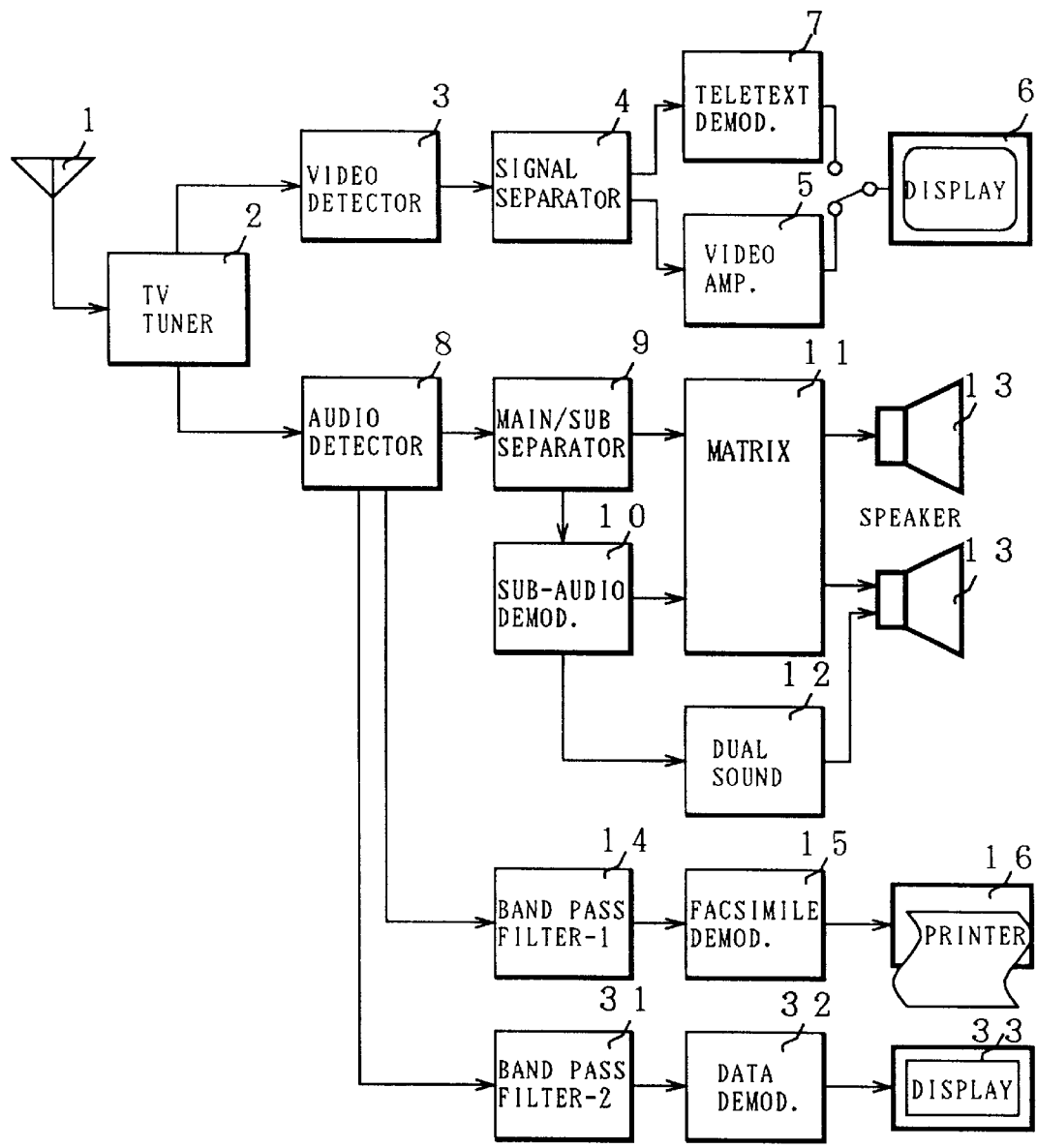
FIG. 15 is a block diagram of a television receiver of an embodiment of the present invention for receiving one-channel multiplexed facsimile and one-channel multiplexed data.

FIG. 15 represents a block diagram of a television receiver for receiving one-channel TV multiplexed facsimile data and one-channel TV multiplexed data using the first sub-carrier of 4.5 fH and the second sub-carrier of 7.5 fH shown in FIGS. 7 and 8 in addition to TV stereo sound, TV dual sound and TV teletext data, together with TV pictures. This television receiver is provided with functions to demodulate and print one-channel TV multiplexed facsimile data using the first sub-carrier of 4.5 fH and to demodulate and display one-channel TV multiplexed data using the second sub-carrier of 7.5 fH instead of the functions to demodulate and print two-channel TV multiplexed facsimile data using the first sub-carrier of 4.5 fH and the second sub-carrier of 7.5 fH shown in FIG. 14. This television receiver comprises a TV tuner, a TV video processor, and a TV audio/multiplexed-signal processor.

Among these component elements, the arrangement and the operation of the TV tuner and the TV video processor as well as the arrangement and the operation to process TV stereo sound and TV dual sound are the same as those of the conventional type television receiver shown in FIG. 3, and a detailed description is not given here.

A first band-pass filter 14 allowing the first sub-carrier of 4.5 fH to pass and a second band-pass filter 31 allowing the second sub-carrier of 7.5 fH to pass are connected to the TV audio detector 8. A TV multiplexed facsimile data demodulator 15 is connected to the first band-pass filter 14, a TV multiplexed data demodulator 32 is connected to the second band-pass filter 31, a TV multiplexed facsimile data printer 16 is connected to the TV multiplexed facsimile data demodulator 15, and a TV multiplexed data display unit 33 is connected to the TV multiplexed data demodulator 32. A display unit to display the TV multiplexed facsimile data may be used instead of or together with the TV multiplexed facsimile data printer 16. A printer for printing the TV multiplexed data may be used instead of or together with the TV multiplexed data display unit 33.

The first sub-carrier of 4.5 fH multiplexed on the TV audio signal is selected by the first band-pass filter 14 as it passes through and the first sub-carrier selected by the first band-pass filter 14 is sent to the TV multiplexed facsimile data demodulator 15. TV multiplexed facsimile data is demodulated from the first sub-carrier at the TV multiplexed facsimile data demodulator 15, and the demodulated TV multiplexed facsimile data is printed by the TV multiplexed facsimile data printer 16.

The second sub-carrier of 7.5 fH multiplexed on the TV audio signal is selected by a second band-pass filter 31 as it passes through and the second sub-carrier selected by the second band-pass filter 31 is sent to the TV multiplexed data demodulator 32. TV multiplexed data is demodulated from the second sub-carrier sent through at the TV multiplexed data demodulator 32, and the demodulated TV multiplexed data is displayed on the TV multiplexed data display unit 33.

Figure 16:
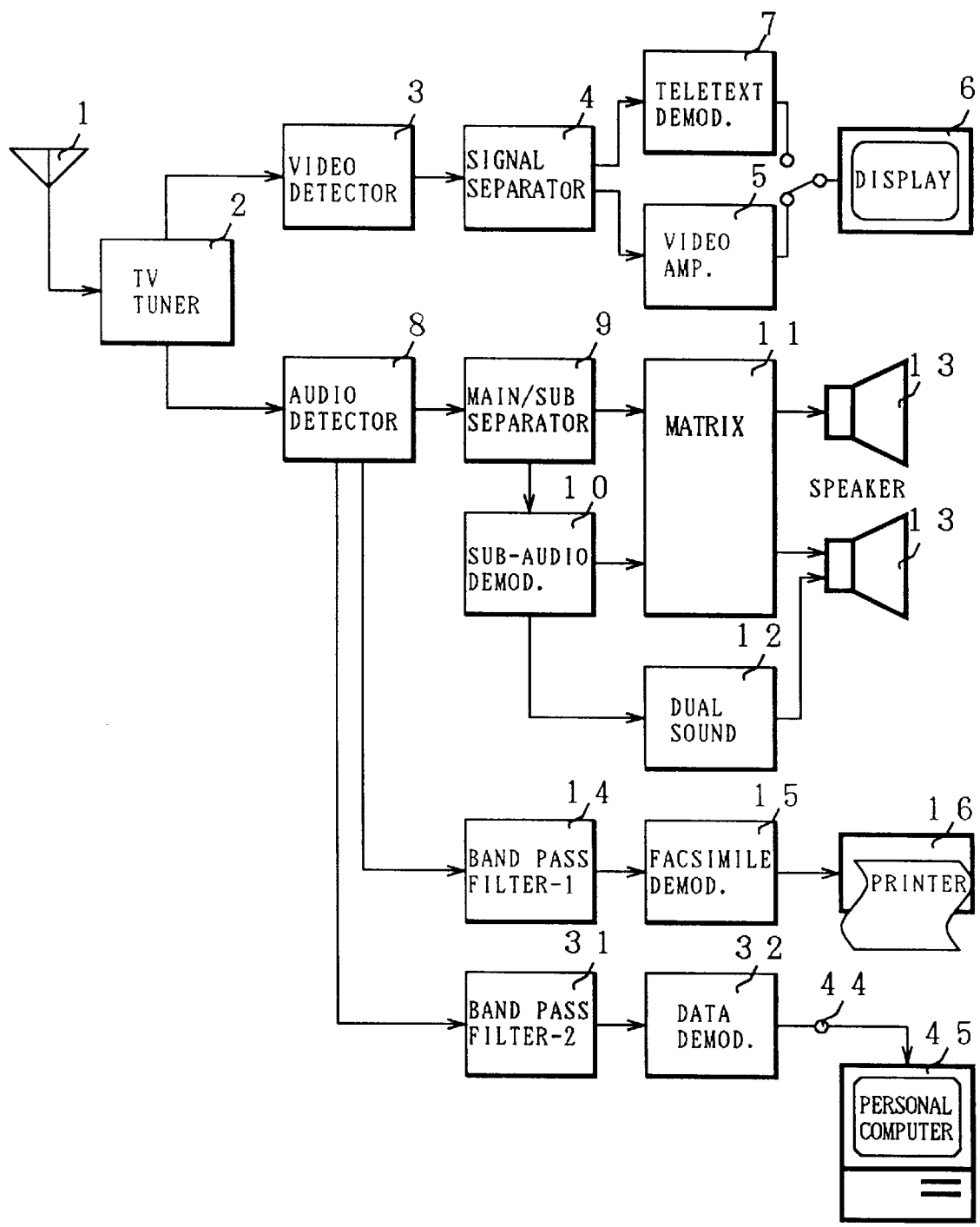
FIG. 16 is a block diagram of a television receiver of an embodiment of the present invention for receiving one-channel multiplexed facsimile and for outputting one-channel multiplexed data to a data processing device.

In the television receiver shown in FIG. 15, the received TV multiplexed data is displayed on the TV multiplexed data display unit 33. In contrast, the television receiver shown in FIG. 16 is designed in such manner that the received TV multiplexed data can be outputted to a data processing device such as a personal computer. Therefore, in case the television receiver of FIG. 16 is used, it is possible to store the received multiplexed data and to utilize it again, or to edit the received multiplexed data, when necessary.

The basic arrangement of this television receiver is the same as that of the television receiver shown in FIG. 15, and a description is not given here for what is common, but only differences will be described. Specifically, a TV multiplexed data demodulator 32 is connected to the second band-pass filter 31 in the television receiver, and the TV multiplexed data demodulator 32 is provided with a connection terminal 44 instead of the TV multiplexed data display unit 33 of FIG. 15, and a personal computer 45 is connected to the connection terminal 44. The personal computer 45 shown here is given only as an example and another device, such as PDA (personal digital assistant), electronic notebook, word processor, and the like, which can process data, may be used.

Figure 17:
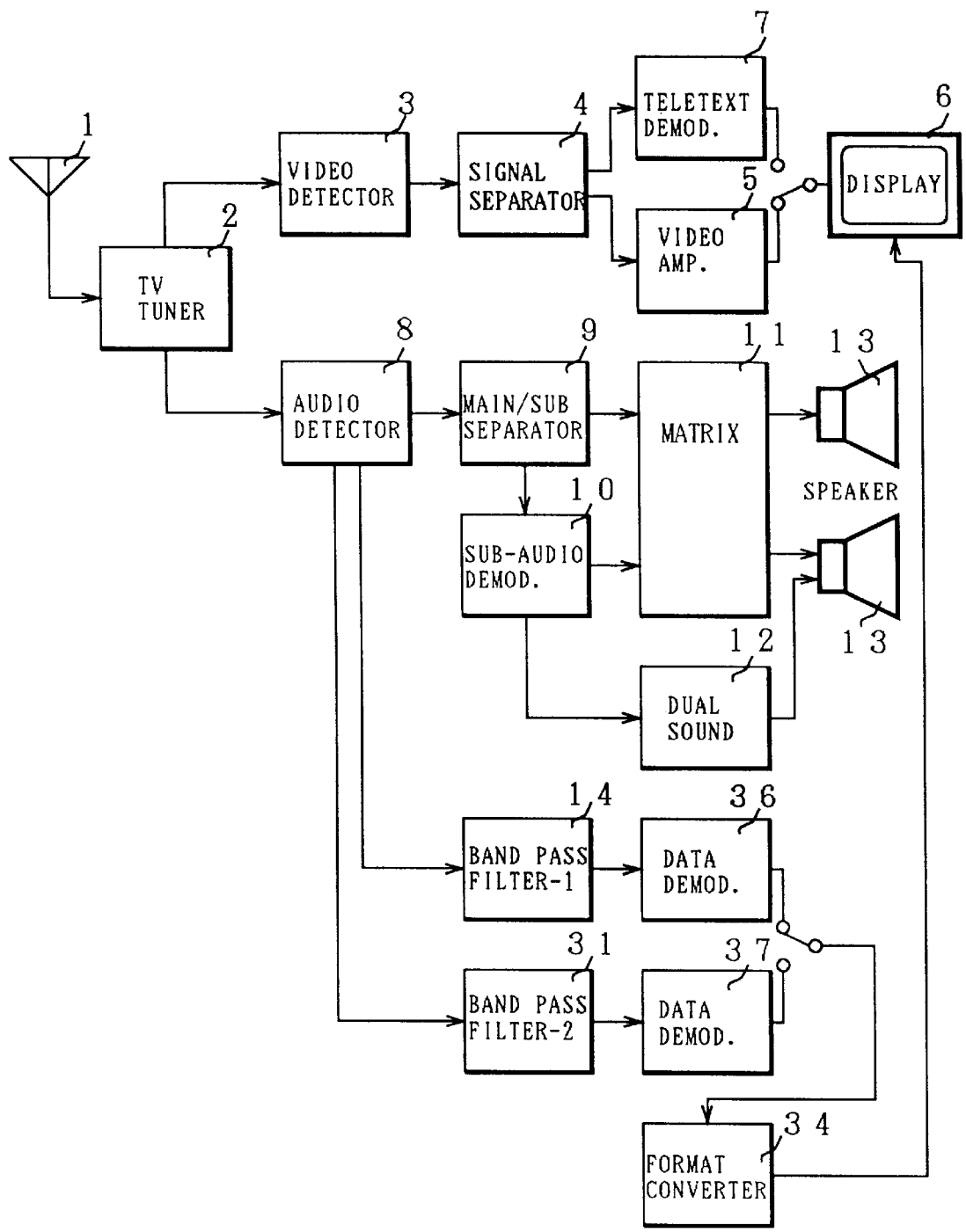
FIG. 17 is a block diagram of a television receiver of another embodiment of the present invention for receiving two-channel TV multiplexed data.

FIG. 17 represents another block diagram of a television receiver for receiving two-channel TV multiplexed data using the first sub-carrier of 4.5 fH and the second sub-carrier of 7.5 fH shown in FIGS. 7 and 8, in addition to TV stereo sound, TV dual sound and TV teletext data together with TV pictures. In this television receiver, the TV multiplexed data is not displayed on the TV multiplexed data display units 38 and 39 of the television receiver for receiving the TV multiplexed data, as shown in FIG. 12, but the multiplexed data is displayed on a TV picture display unit, such as a cathode ray tube for displaying a television picture.

This television receiver, like the television receiver shown in FIG. 12, comprises a TV tuner, a TV video processor, and a TV audio/multiplexed-data processor. However, unlike the television receiver of FIG. 12, the first TV multiplexed data demodulator 36 and the second TV multiplexed data demodulator 37 are switched over and connected to a TV format converter 34 instead of being respectively connected to the TV multiplexed data display unit 38 and the TV multiplexed data display unit 39. At the TV format converter 34, the TV multiplexed data is converted to a format which can be displayed by the cathode ray tube, and it is displayed on the TV picture display unit 6 alone or after being synthesized with TV pictures or teletext pictures. The balance of the arrangement is common to the aforementioned embodiments, and a detailed description is not given here.

Figure 18:
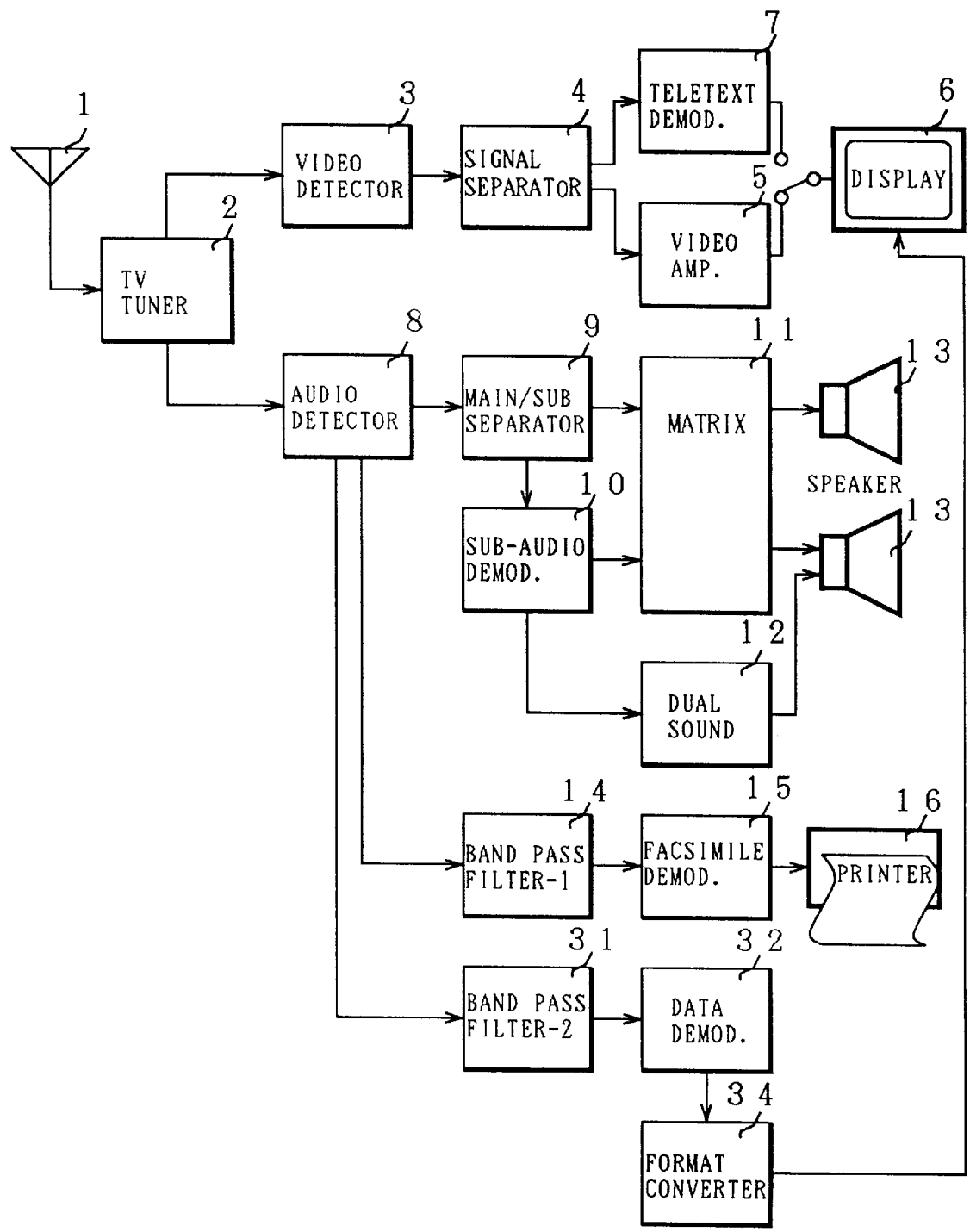
FIG. 18 is a block diagram of a television receiver of an embodiment of the present invention for receiving one-channel multiplexed facsimile and one-channel multiplexed data.

FIG. 18 shows another block diagram of a television receiver for receiving one-channel TV multiplexed facsimile data and one-channel TV multiplexed data using the first sub-carrier of 4.5 fH and the second sub-carrier of 7.5 fH shown in FIGS. 7 and 8, in addition to TV stereo sound, TV dual sound and TV teletext data, together with TV pictures. In this television receiver, the data demodulated from one-channel TV multiplexed data is not displayed on the TV multiplexed data display unit 33 using the second sub-carrier of 7.5 fH in the television receiver as shown in FIG. 15, but the data is displayed on a TV picture display unit, such as a cathode ray tube, which displays television pictures. Like the television receiver shown in FIG. 15, this television receiver comprises a TV tuner, a TV video processor, and a TV audio/multiplexed-signal processor. Unlike the television receiver shown in FIG. 15, a TV format converter 34 is connected to the TV multiplexed data demodulator 32 instead of the TV multiplexed data display unit 33. At the TV format converter 34, the TV multiplexed data is converted to a format which can be displayed by the cathode ray tube, and it is displayed alone on the TV picture display unit 6 or after being synthesized with a television picture or teletext picture. The other parts of the arrangement are common to aforementioned embodiments, and a detailed description is not given here.

Figure 19:
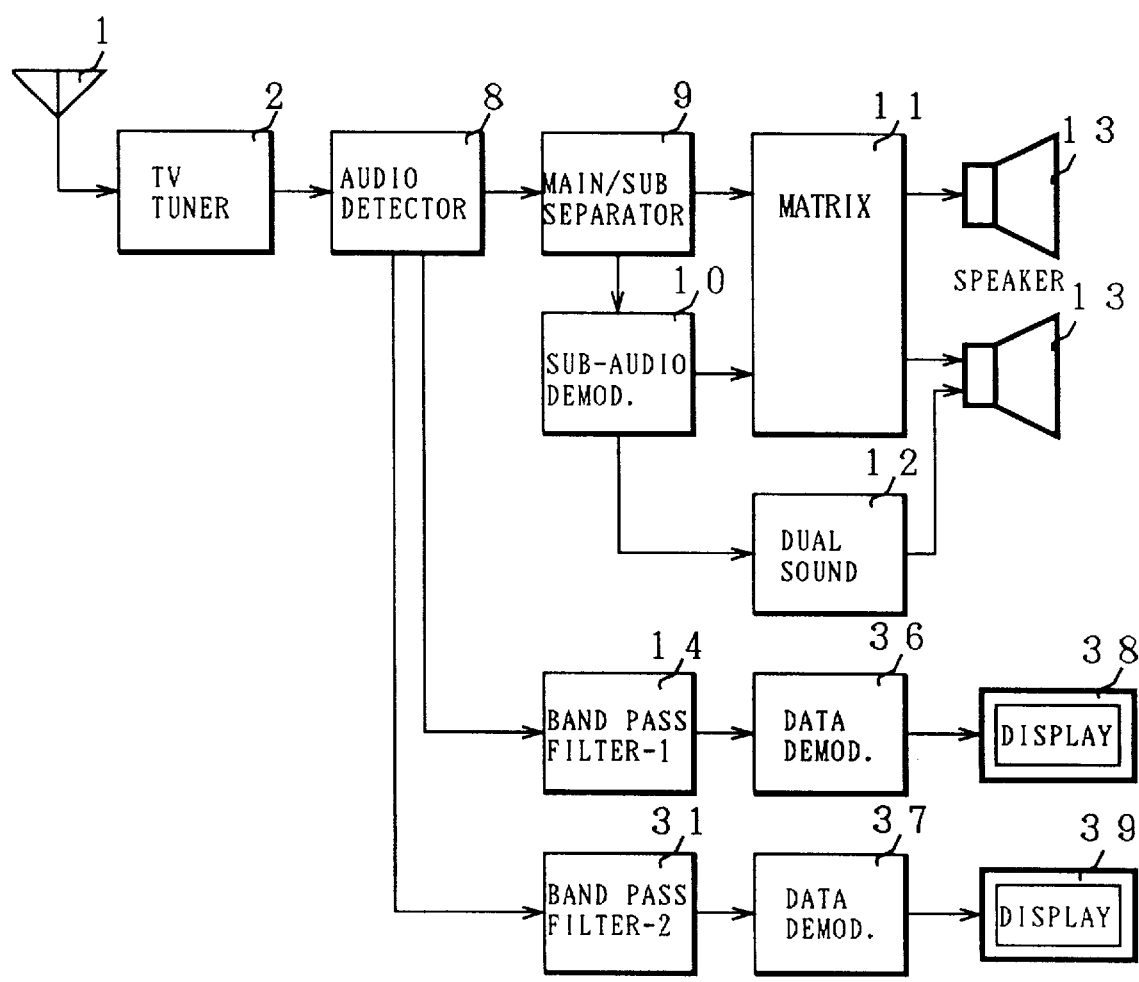
FIG. 19 is a block diagram of a television receiver of an embodiment of the present invention for receiving two-channel TV multiplexed data.
Figure 20:
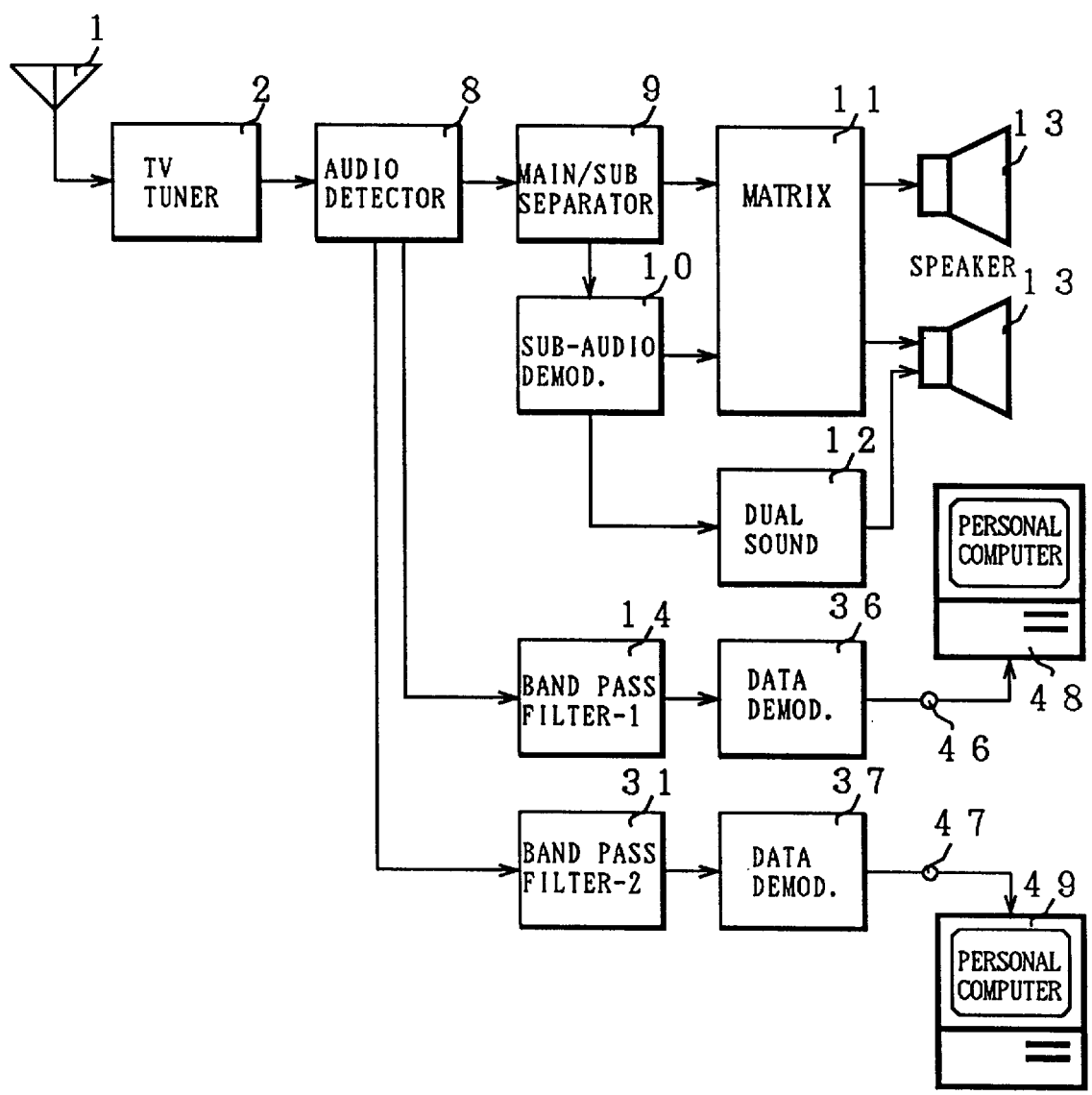
FIG. 20 is a block diagram of a television receiver of an embodiment of the present invention for outputting two-channel TV multiplexed data to a data processing device.

Each of FIGS. 19–20 represents a block diagram of a receiver for receiving two-channel TV multiplexed data using a first sub-carrier of 4.5 fH and a second sub-carrier of 7.5 fH in addition to receiving audio television broadcasting and receiving TV stereo sound and TV dual sound. The receiver shown in FIG. 19 comprises a TV tuner and a TV audio/multiplexed-data processor. The TV tuner comprises a TV tuner 2 connected to a TV antenna 1.

The TV audio/multiplexed-data processor comprises a TV audio detector 8 connected to the TV tuner 2, a TV main/sub audio separator 9 connected to the TV audio detector 8, a TV sub audio demodulator 10 connected to the TV main/sub audio separator 9, a TV stereo matrix circuit 11 connected to the TV main/sub audio separator 9 and the TV sub audio demodulator 10, and a TV dual sound circuit 12 connected to the TV sub audio demodulator 10. The TV stereo matrix circuit 11 and the TV dual sound circuit 12 are connected to speakers 13.

A first band-pass filter 14 allowing the first sub-carrier of 4.5 fH to pass and a second band-pass filter 31 allowing the second sub-carrier of 7.5 fH to pass are also connected to the TV audio detector 8. A first TV multiplexed data demodulator 36 is connected to the first band-pass filter 14, a second TV multiplexed data demodulator 37 is connected to the second band-pass filter 31, and TV multiplexed data display units 38 and 39 are connected to the first TV multiplexed data demodulator 36 and the second TV multiplexed data demodulator 37, respectively. A display unit for displaying the TV multiplexed data may be used instead of or together with the two TV multiplexed display units 38 and 39.

In this receiver, the television broadcast signal is received by the TV antenna 1 and the audio signal is tuned and selected by the TV tuner 2. The audio signal thus tuned and selected is detected by the TV audio detector 8, and it is separated into a main audio signal and a sub audio signal by the TV main/sub audio separator 9. In case the sub audio is stereo, the stereo audio is picked up by the TV stereo matrix circuit 11 from the main audio signal and from the sub audio signal demodulated by the TV sub audio demodulator 10. In case the demodulated sub audio is of dual sound, the sub audio signal demodulated by the TV sub audio demodulator 10 is picked up via the TV dual sound circuit 12, and these audio signals are converted to sound at the speakers 13.

The first sub-carrier of 4.5 fH multiplexed on the TV audio signal is selected by the first band-pass filter 14 as it passes through and the first sub-carrier selected by the first band-pass filter 14 is sent to the first TV multiplexed data demodulator 36. TV multiplexed data is demodulated from the first sub-carrier sent through at the first TV multiplexed data demodulator 36, and the demodulated TV multiplexed data is displayed on the TV multiplexed data display unit 38.

The second sub-carrier of 7.5 fH multiplexed on the TV audio signal is selected by the second band-pass filter 31 as it passes through and the second sub-carrier selected by the second band-pass filter 31 is sent to the second TV multiplexed demodulator 37. TV multiplexed data is demodulated from the second sub-carrier at the second TV multiplexed data demodulator 37, and the demodulated TV multiplexed data is displayed on the TV multiplexed data display unit 39.

Although two TV multiplexed data display units 38 and 39 are used in this embodiment, it may be designed in such manner that only one TV multiplexed data display unit is used by switching over, or that data may be displayed on one TV multiplexed data display unit at the same time.

In the receiver shown in FIG. 19, two-channel TV multiplexed data received is displayed on the TV multiplexed data display units 38 and 39. In contrast, the receiver shown in FIG. 20 is designed in such manner that the received two-channel TV multiplexed data can be outputted to a data processing device such as a personal computer. Therefore, in case the receiver of FIG. 20 is used, it is possible to store the received multiplexed data and to utilize it again, or to edit it when necessary.

The basic configuration of this receiver is the same as that of the receiver of FIG. 19; therefore, a description is not given here for elements common to both, but only differences will be described. Specifically, the first TV multiplexed data demodulator 36 is connected to the first band-pass filter 14 of the receiver, and the first TV multiplexed data demodulator 36 is provided with a connection terminal 46 instead of the first TV multiplexed data display unit 38 of FIG. 19, and a personal computer 48 is connected to the connection terminal 46. The second TV multiplexed data demodulator 37 is connected to the second band-pass filter 31, and the second TV multiplexed data demodulator 37 is provided with a connection terminal 47 instead of the second TV multiplexed data display unit 39 of FIG. 19, and a personal computer 49 is connected to the connection terminal 47.

The personal computers 48 and 49 shown here are given only as examples and other devices, such as PDA (personal digital assistant), electronic notebooks, word processors, and the like, which can process data, may be used.

Figure 21:
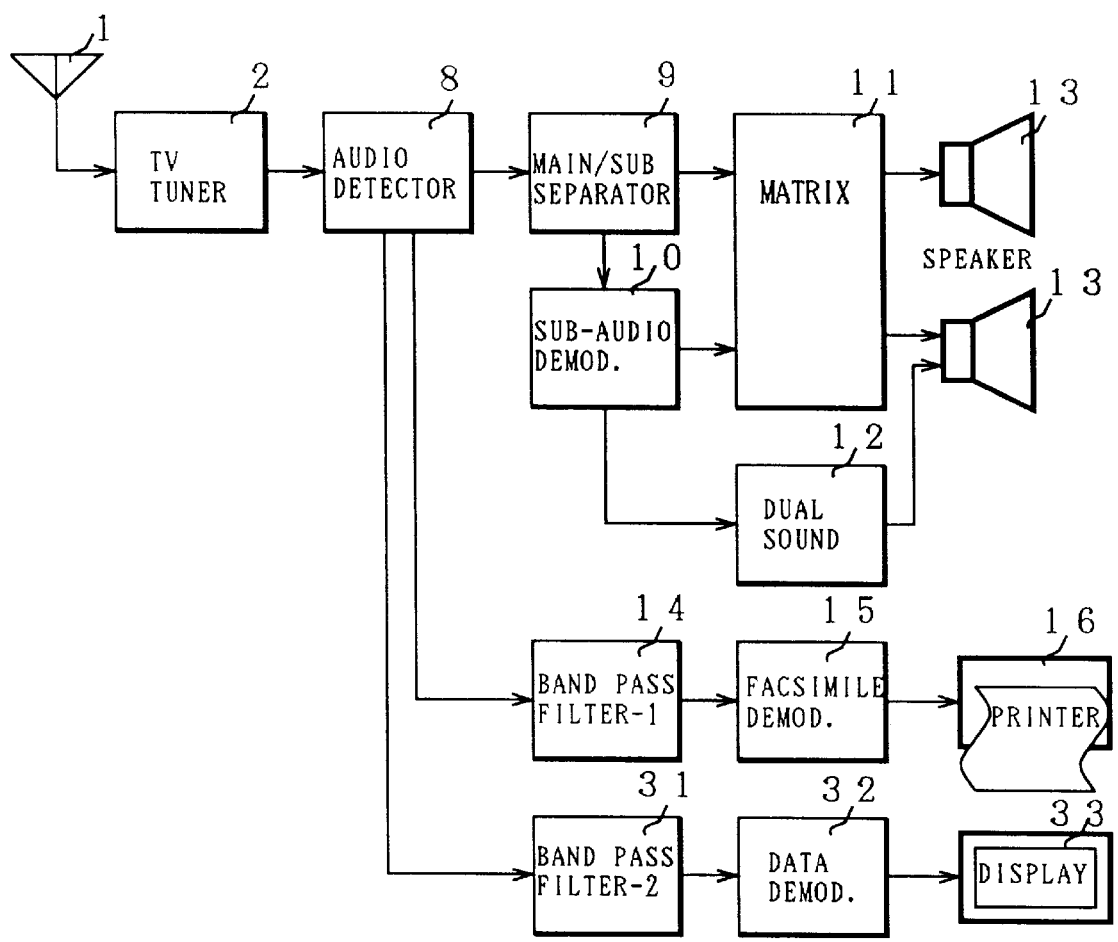
FIG. 21 is a block diagram of a television receiver of an embodiment of the present invention for receiving one-channel multiplexed facsimile and one-channel multiplexed data.

FIG. 21 represents another block diagram of a receiver for receiving one-channel TV multiplexed facsimile data and one-channel TV multiplexed data using a first sub-carrier of 4.5 fH and a second sub-carrier of 7.5 fH, in addition to receiving the audio of television broadcasting and receiving TV stereo sound and TV dual sound. This receiver is provided with functions to demodulate and print one-channel TV multiplexed facsimile data using the first sub-carrier of 4.5 fH and to demodulate and display one-channel TV multiplexed data using the second sub-carrier of 7.5 fH instead of the functions to demodulate and print two-channel TV multiplexed facsimile data using the first sub-carrier of 4.5 fH and the second sub-carrier of 7.5 fH as shown in FIG. 14.

This receiver comprises a TV tuner and a TV audio/multiplexed-data processor. Among these component elements, the arrangement and operation of the TV tuner and the processing of the TV stereo sound and TV dual sound are the same as for the receiver shown in FIG. 14, and a detailed description is not given here.

A first band-pass filter 14 allowing the first sub-carrier of 4.5 fH to pass and a second band-pass filter 31 allowing the second sub-carrier of 7.5 fH to pass are connected to the TV audio detector 8. A TV multiplexed facsimile data demodulator 15 is connected to the first band-pass filter 14, a TV multiplexed data demodulator 32 is connected to the second band-pass filter 31, a TV multiplexed facsimile data printer 16 is connected to the TV multiplexed facsimile data demodulator 15, and a TV multiplexed data display unit 33 is connected to the TV multiplexed data demodulator 32.

A display unit for displaying the TV multiplexed facsimile data may be used instead of or together with the TV multiplexed facsimile data printer 16. A printer for printing the TV multiplexed data may be used instead of or together with the TV multiplexed data display unit 33.

The first sub-carrier of 4.5 fH multiplexed on the TV audio signal is selected by the first band-pass filter 14 as it passes through and the first sub-carrier selected by the first band-pass filter 14 is sent to the TV multiplexed facsimile data demodulator 15. TV multiplexed facsimile data is demodulated from the first sub-carrier at the TV multiplexed facsimile data demodulator 15, and the demodulated TV multiplexed facsimile data is printed by the TV multiplexed facsimile data printer 16.

The second sub-carrier of 7.5 fH multiplexed on the TV audio signal is selected by the second band-pass filter 31 as it passes through and the second sub-carrier selected by the second band-pass filter 31 is sent to the TV multiplexed data demodulator 32. TV multiplexed data is demodulated from the second sub-carrier sent through at the TV multiplexed data demodulator 32, and the demodulated TV multiplexed data is displayed on the TV multiplexed data display unit 33.

Figure 22:
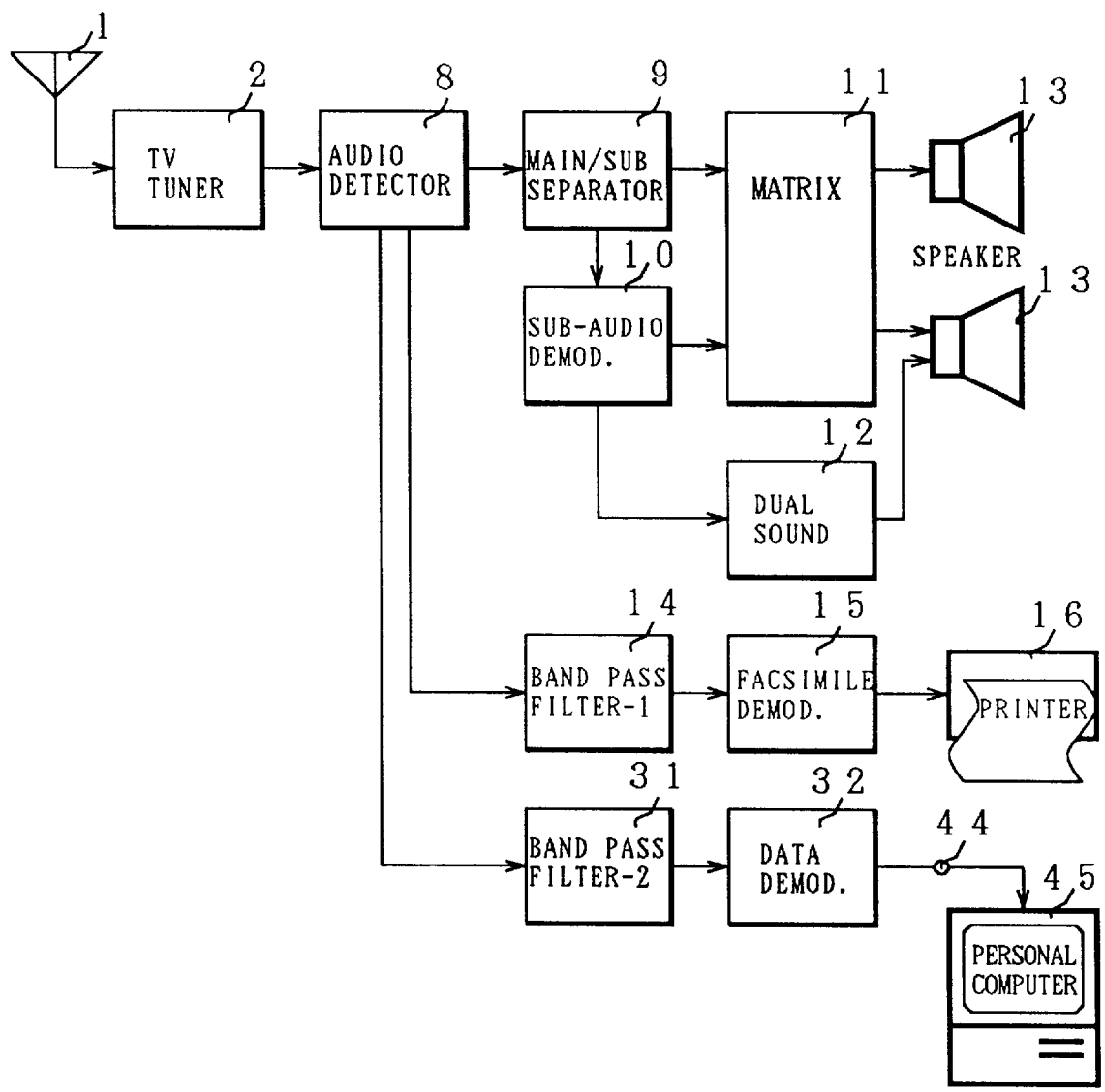
FIG. 22 is a block diagram of a television receiver of an embodiment of the present invention for receiving one-channel multiplexed facsimile and for outputting one-channel multiplexed data to a data processing device.

In the receiver shown in FIG. 21, the received TV multiplexed data is displayed on the TV multiplexed data display unit 33. In contrast, the receiver shown in FIG. 22 is designed in such manner that the received TV multiplexed data can be outputted to a data processing unit such as a personal computer. Therefore, in case the receiver shown in FIG. 22 is used, it is possible to store the received multiplexed data and to utilize it again, or to edit the received multiplexed data, when necessary.

The basic arrangement of this television receiver is the same as that of the television receiver of FIG. 21. Thus, a description is not given here for elements common to both, but only differences will be described. Specifically, the TV multiplexed data demodulator 32 is connected to the second band-pass filter 31 in the television receiver, the TV multiplexed data demodulator 32 is provided with a connection terminal 44 instead of the TV multiplexed data display unit 33 of FIG. 21, and a personal computer 45 is connected to the connection terminal 44.

The personal computer 45 shown here is given as an example only and another device, such as PDA (personal digital assistant), electronic notebook, word processor, and the like, which can process data, may be connected.

Next, a description will be given of a receiver for receiving multiplexed data multiplexed on an FM broadcast and multiplexed data multiplexed on the sub-carrier of a television broadcast, in addition to receiving the audio of the television broadcast and the FM broadcast and receiving stereo sound and dual sound. Prior to the detailed explanation, a brief description will be given of a conventional type receiver for receiving an FM multiplexed data broadcast together with the stereo sound of the FM broadcast.

Figure 5:
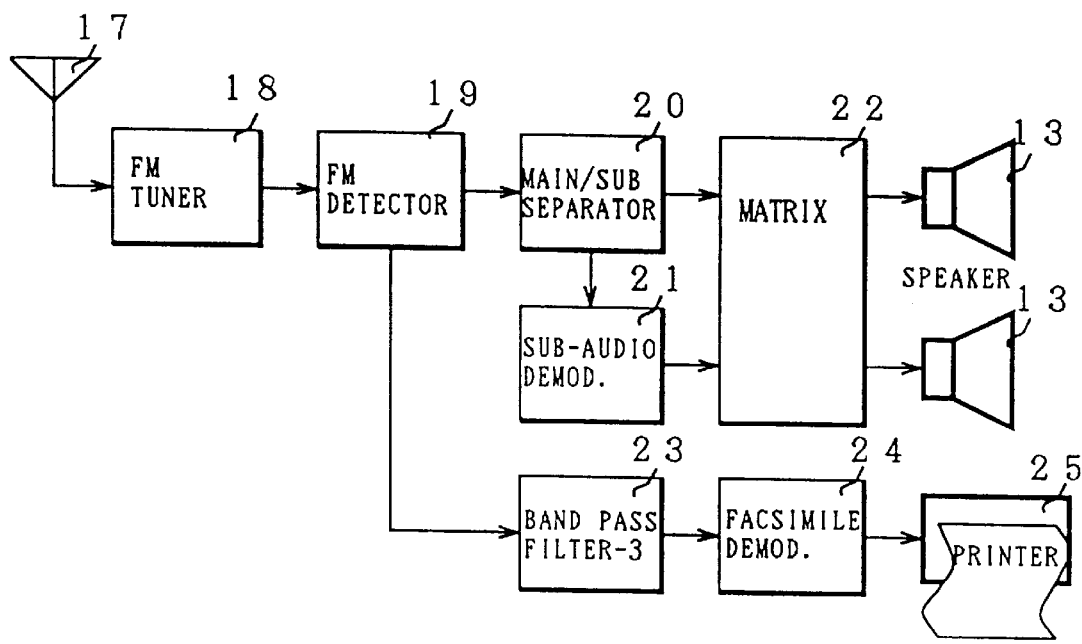
FIG. 5 is a block diagram of a conventional type FM multiplexed facsimile receiver.
Figure 6:
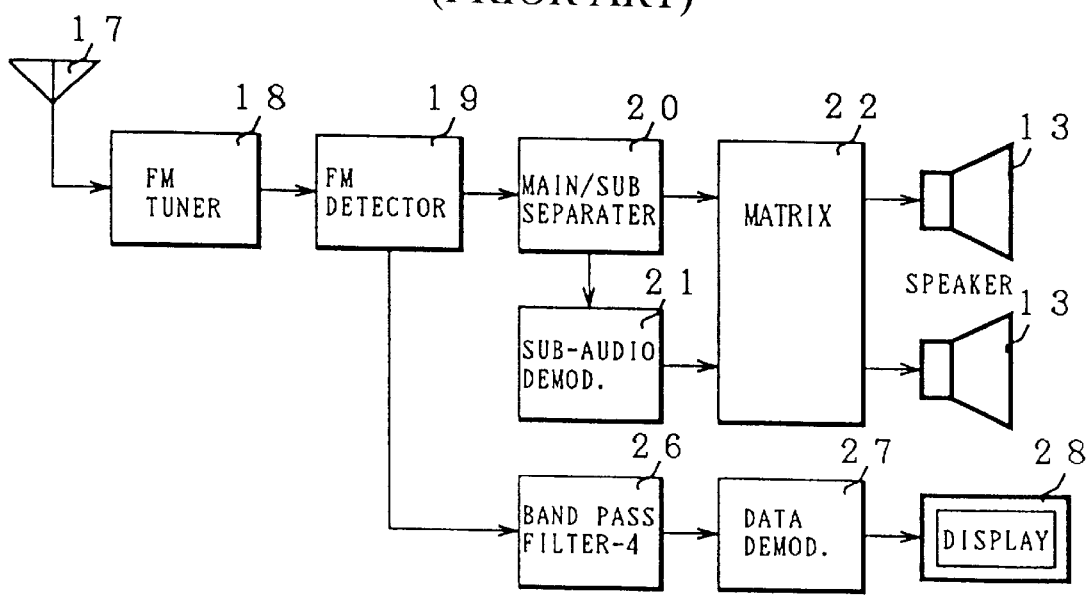
FIG. 6 is a block diagram of a conventional type FM multiplexed data receiver.
Figure 23:
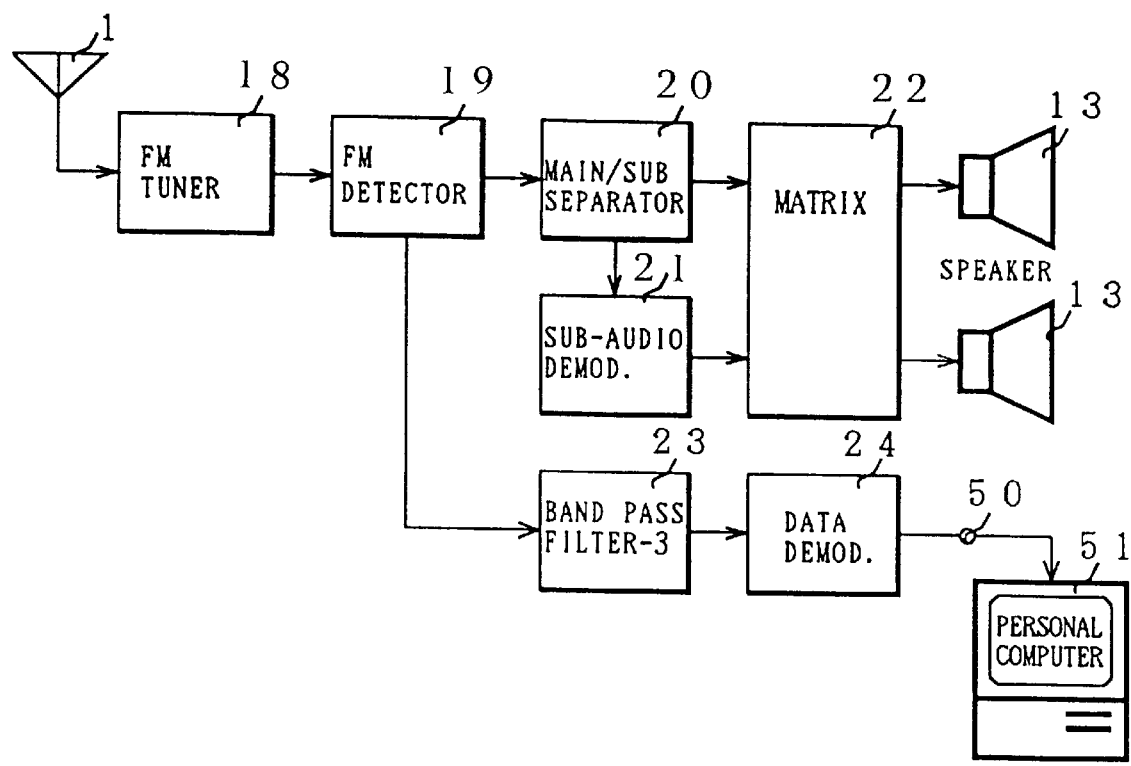
FIG. 23 is a block diagram of a receiver for outputting FM multiplexed data to a data processing device.

The receiver shown in FIG. 23 comprises an FM tuner and an FM audio/multiplexed-data processor. Among these component elements, the arrangement and the operation of the FM tuner and the processing of the FM stereo sound are the same as those of the receiver shown in FIG. 5; thus, a detailed description is not given here.

A third band-pass filter 23 allowing the sub-carrier for FM data to pass is further connected to the FM detector 19. An FM multiplexed data demodulator 24 is connected to the third band-pass filter 23, the FM multiplexed data demodulator 24 is provided with a connection terminal 50, and a personal computer 51 is connected to the connection terminal 50. The personal computer 51 shown here is given only as an example and another device, such as PDA (personal digital assistant), electronic notebook, word processor, and the like, which can process data, may be connected.

Figure 24:
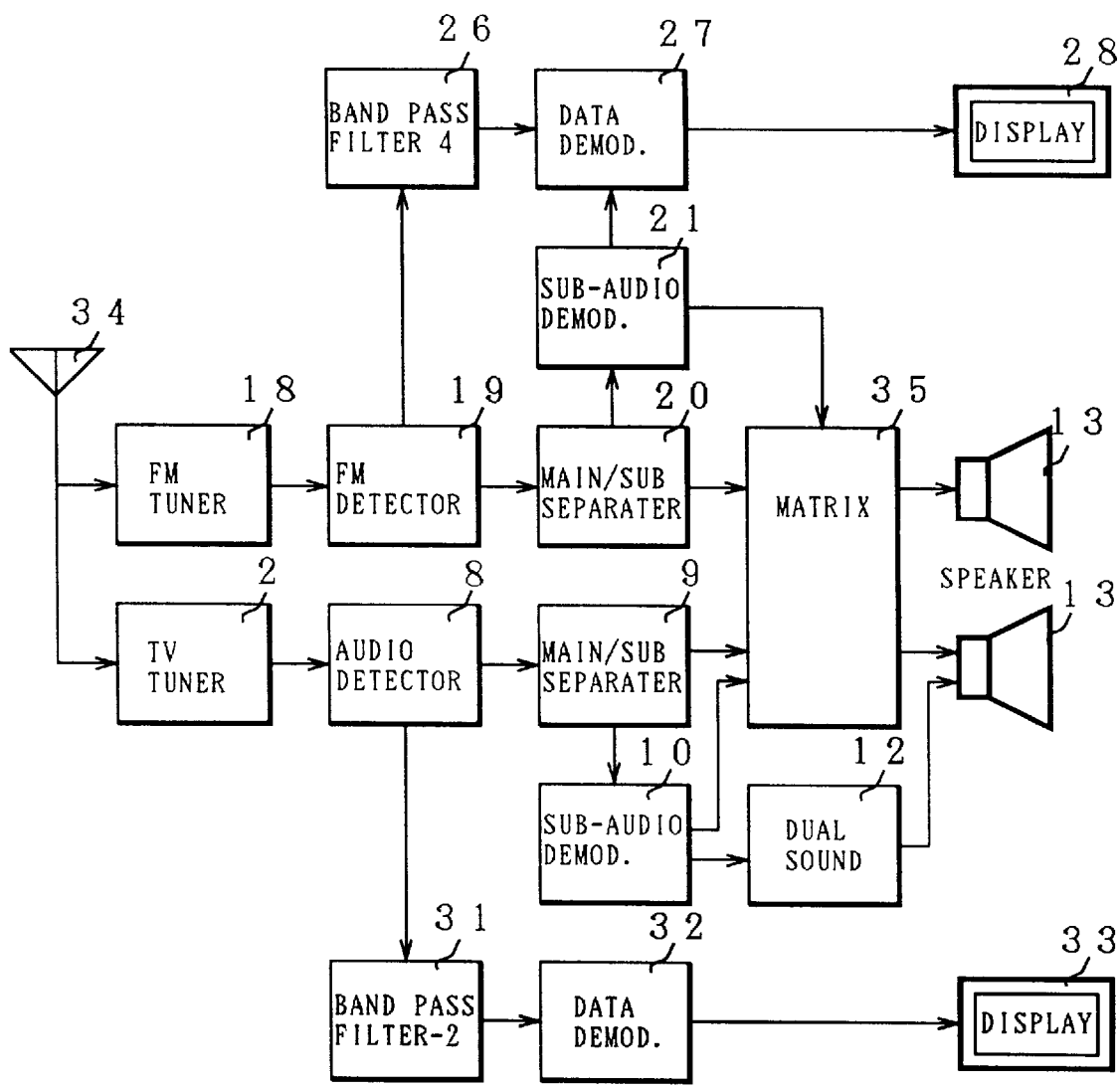
FIG. 24 is a block diagram of a receiver for receiving FM multiplexed data and one-channel TV multiplexed data.

FIG. 24 represents a block diagram of a receiver for receiving multiplexed data multiplexed on the FM broadcast and multiplexed data multiplexed using the first sub-carrier of 4.5 fH and the second sub-carrier of 7.5 fH of the television broadcast as shown in FIGS. 7 and 8, in addition to receiving the audio of the FM broadcast and television broadcast and receiving the stereo sound and dual sound. This receiver comprises an FM tuner, an FM audio/multiplexed-data processor, a TV tuner and a TV audio/multiplexed-data processor.

The FM tuner comprises an FM tuner 18 connected to an antenna 34 for both FM and TV. The FM audio/multiplexed-data processor comprises an FM detector 19 connected to the FM tuner 18, an FM main/sub audio separator 20 connected to the FM detector 19, an FM sub audio demodulator 21 connected to the FM main/sub audio separator 20, an FM/TV stereo matrix circuit 35 connected to the FM main/sub audio separator 20 and to the FM sub audio demodulator 21, and speakers 13 connected to the FM/TV stereo matrix circuit 35.

A fourth band-pass filter 26 allowing the sub-carrier for FM data to pass is connected to the FM detector 19. An FM multiplexed data demodulator 27 is connected to the fourth band-pass filter 26, and an FM multiplexed data display unit 28 is connected to the FM multiplexed data demodulator 27.

The television tuner comprises a TV tuner 2 connected to the FM/TV antenna 34. The TV audio/multiplexed-data processor comprises a TV audio detector 8 connected to the TV tuner 2, a TV main/sub audio separator 9 connected to the TV audio detector 8, a TV sub audio demodulator 10 connected to the TV main/sub audio separator 9, an FM/TV stereo matrix circuit 35 connected to the TV main/sub audio separator 9 and to the TV sub audio demodulator 10, and a TV dual sound circuit 12 connected to the TV sub audio demodulator 10. Speakers 13 are connected to the FM/TV stereo matrix circuit 35 and the TV dual sound circuit.

A second band-pass filter 31 allowing the second sub-carrier of 7.5 fH to pass is connected to the TV audio detector 8. A TV multiplexed data demodulator 32 is connected to the second band-pass filter 31, and a TV multiplexed data display unit 33 is connected to the TV multiplexed data demodulator 32. A printer for printing the TV multiplexed data may be used instead of or together with the TV multiplexed display unit 33.

In this receiver, the FM broadcast signal received by the FM/TV antenna 34 is tuned and selected by the FM tuner 18. The FM audio signal thus tuned and selected is detected by the FM detector 19 and is separated into a main audio signal and a sub audio signal by the FM main/sub audio separator 20. From the main audio signal and the sub audio signal, stereo audio is picked up by the FM/TV stereo matrix circuit 35, and these audio signals are converted to sound at the speakers 13.

The sub-carrier for FM multiplexed data multiplexed on the audio signal is selected by the fourth band-pass filter 26 as it passes through, and the sub-carrier for FM multiplexed data selected by the fourth band-pass filter 26 is sent to the FM multiplexed data demodulator 27. At the FM multiplexed data demodulator 27, FM multiplexed data is demodulated from the sub-carrier thus sent, and the demodulated FM multiplexed data is displayed on the FM multiplexed data display unit 28.

The audio signal is tuned and selected by the TV tuner 2 on the television broadcast signal received by the FM/TV antenna 34. The audio signal thus tuned and selected is detected by the TV audio detector 8 and is separated into a main audio signal and a sub audio signal at the TV main/sub audio separator 9. In case the sub audio is stereo, the stereo audio is picked up from the main audio signal and the sub audio signal demodulated at the TV sub audio demodulator 10 by the FM/TV stereo matrix circuit 35. In case the demodulated sub audio is a TV dual sound, the sub audio signal demodulated at the TV sub audio demodulator 10 is picked up via the TV dual sound circuit 12. These audio signals are converted to sound at the speakers 13.

The second sub-carrier of 7.5 fH multiplexed on the TV audio signal is selected by the second band-pass filter 31 as it passes through, and the second sub-carrier selected by the second band-pass filter 31 is sent to the TV multiplexed data demodulator 32. TV multiplexed data is demodulated from the second sub-carrier sent through at the TV multiplexed data demodulator 32, and the demodulated TV multiplexed data is displayed on the TV multiplexed data display unit 33.

In the embodiment shown in FIG. 24, the FM multiplexed data display unit 28 and the TV multiplexed data display unit 33 are used, so that it is possible to use a single data display unit at a time by switching over or to display data on both data display units at the same time.

Figure 25:
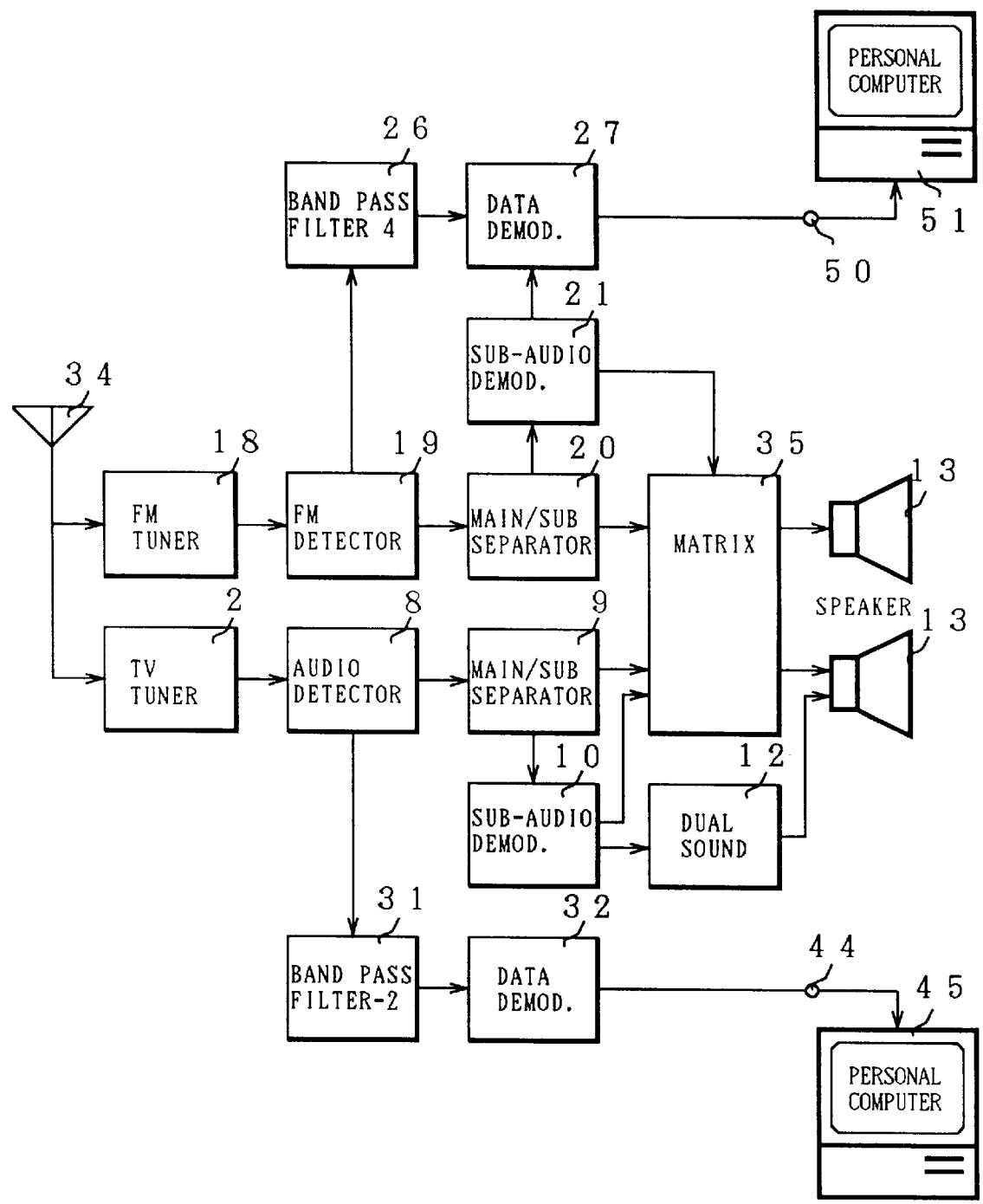
FIG. 25 is a block diagram of a receiver for outputting FM multiplexed data and one-channel TV multiplexed data.

In the receiver shown in FIG. 24, the received FM multiplexed data is displayed on the FM multiplexed data display unit 28, and the received TV multiplexed data is displayed on the TV multiplexed data display unit 33. In contrast, the receiver shown in FIG. 25 is designed in such manner that the received FM multiplexed data and the TV multiplexed data can be outputted to a data processing device such as a personal computer. Therefore, in case the receiver shown in FIG. 25 is used, it is possible to store the received multiplexed data and to utilize it again, or to edit the received multiplexed data, when necessary.

The basic arrangement of this television receiver is the same as that of the television receiver shown in FIG. 24. Thus, a description will not be given here for features common to both, but only differences will be described. Specifically, a TV multiplexed data demodulator 32 is connected to the second band-pass filter 31 of the TV tuner. The TV multiplexed data demodulator 32 is provided with a connection terminal 44 instead of the TV multiplexed data display unit 33 of FIG. 24, and a personal computer 45 is connected to the connection terminal 44. An FM multiplexed data demodulator 27 is connected to the fourth band-pass filter 26 of the FM tuner, the FM multiplexed data demodulator 27 is provided with a connection terminal 50 instead of the FM multiplexed data display unit 28 of FIG. 24, and a personal computer 51 is connected to the connection terminal 50. The personal computers 45 and 51 shown here are given merely as examples and other devices, such as PDA (personal digital assistant), electronic notebooks, word processors, and the like, which can process data, may be connected.

Figure 26:
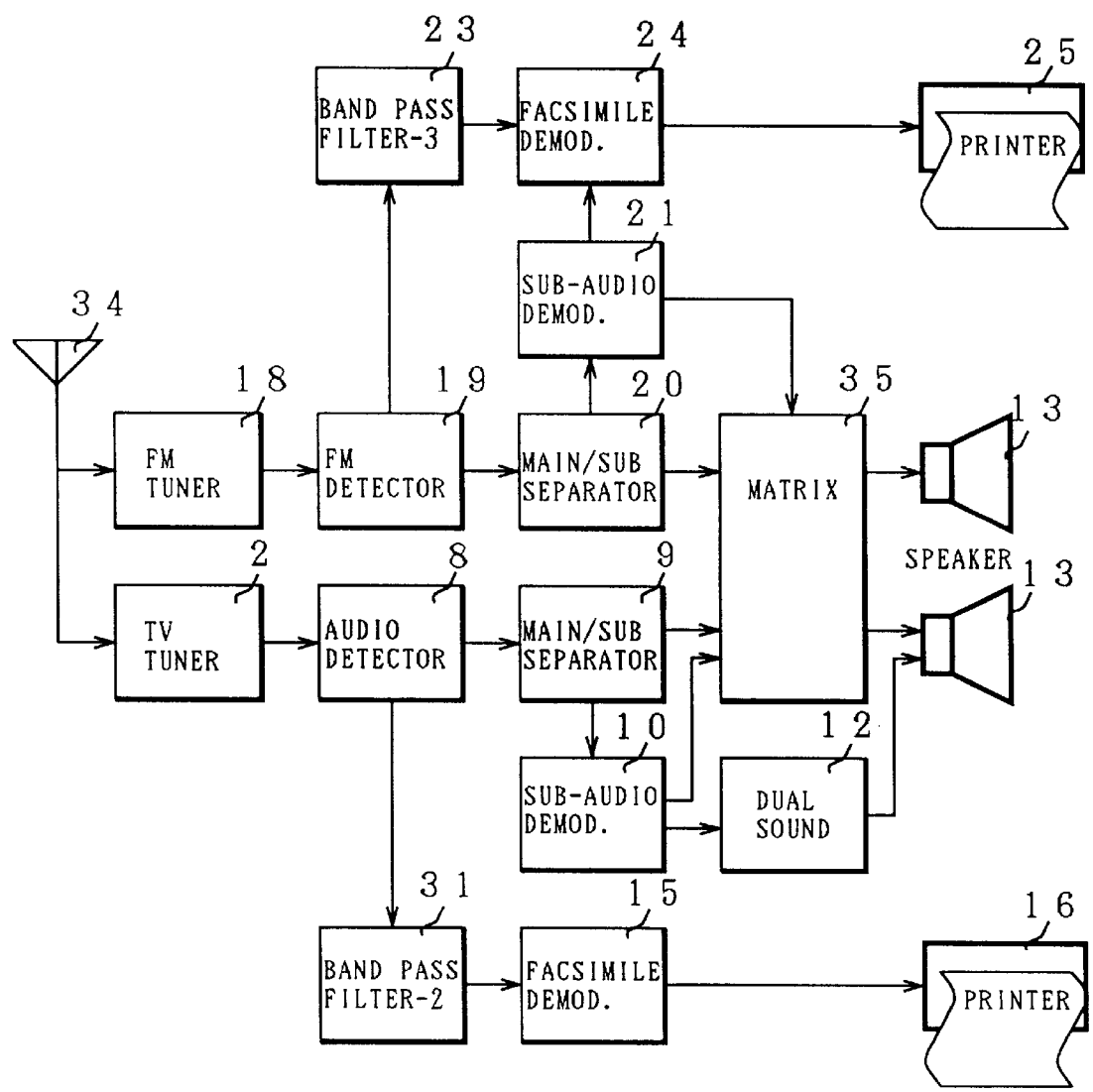
FIG. 26 is a block diagram of a receiver for receiving FM multiplexed facsimile and one-channel TV multiplexed facsimile.

FIG. 26 represents a block diagram of a receiver for receiving multiplexed facsimile broadcasting of an FM broadcast and a television broadcast in addition to receiving the audio of the FM broadcast and the television broadcast and to receiving stereo sound and dual sound. This receiver comprises an FM tuner, an FM audio/multiplexed-facsimile processor, a TV tuner and a TV audio/multiplexed-facsimile processor.

Among these component elements, the arrangement of the FM tuner and the processing of the FM stereo sound, as well as the arrangement and the operation of the TV tuner and the processing of the TV stereo sound and the TV dual sound, are the same as those of the receiver shown in FIG. 24; thus, a detailed description is not given here.

A third band-pass filter 23 allowing the sub-carrier for FM facsimile data to pass is connected to the FM detector 19. An FM multiplexed facsimile data demodulator 24 is connected to the third band-pass filter 23, and an FM multiplexed facsimile data printer 25 is connected to the FM multiplexed data demodulator 24. A second band-pass filter 31 allowing the second sub-carrier of 7.5 fH to pass is connected to the TV audio detector 8. A TV multiplexed facsimile data demodulator 15 is connected to the second band-pass filter 31, and a TV multiplexed facsimile data printer 16 is connected to the TV multiplexed facsimile data demodulator 15.

The sub-carrier for FM multiplexed facsimile data multiplexed on the audio signal is selected by the third band-pass filter 23 as it passes through, and the sub-carrier for FM multiplexed facsimile data selected by the third band-pass filter 23 is sent to the FM multiplexed facsimile data demodulator 24. FM multiplexed facsimile data is demodulated from the sub-carrier at the FM multiplexed facsimile data demodulator 24, and the demodulated FM multiplexed facsimile data is printed by the FM multiplexed facsimile data printer 25.

The second sub-carrier of 7.5 fH multiplexed on the TV audio signal is selected by the second band-pass filter 31 as it passes through, and the second sub-carrier selected by the second band-pass filter 31 is sent to the TV multiplexed facsimile data demodulator 15. TV multiplexed facsimile data is demodulated from the second sub-carrier at the TV multiplexed facsimile data demodulator 15, and the demodulated TV multiplexed facsimile data is printed by the TV multiplexed facsimile data printer 16.

In the embodiment shown in FIG. 26, the FM multiplexed facsimile data printer 25 and the TV multiplexed facsimile data printer 16 are used, whereas only one facsimile data printer may be used by switching over. Also, a display unit for displaying the TV multiplexed facsimile data may be used instead of or together with the FM multiplexed facsimile data printer 25 and the TV multiplexed facsimile data printer 16.

Figure 27:
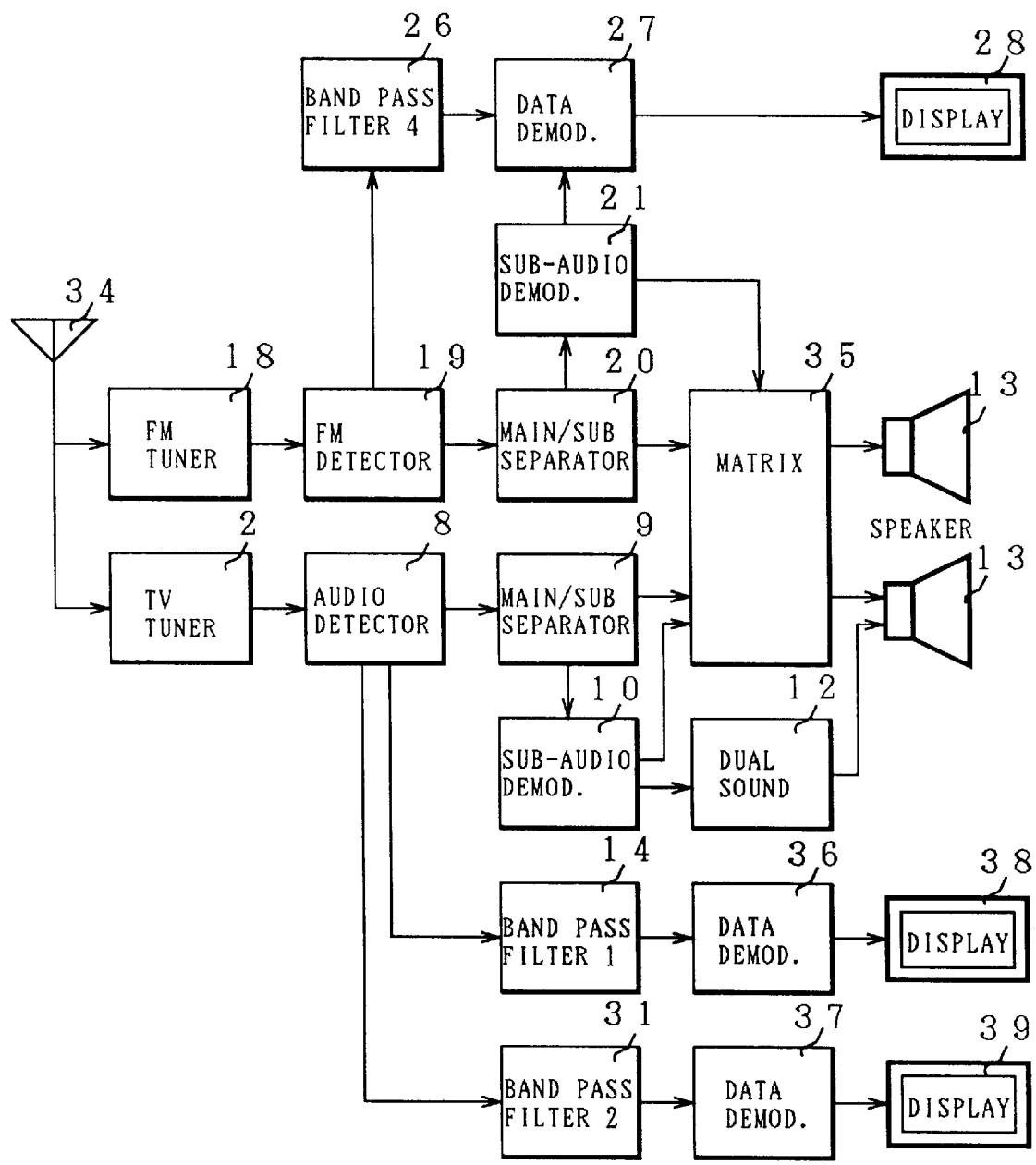
FIG. 27 is a block diagram of a receiver of an embodiment of the present invention for receiving FM multiplexed data and two-channel TV multiplexed data.

FIG. 27 represents a block diagram of a receiver for receiving multiplexed data multiplexed on an FM broadcast and two-channel multiplexed data multiplexed using a first sub-carrier of 4.5 fH and a second sub-carrier of 7.5 fH multiplexed on the TV audio signal of a television broadcast, in addition to receiving the audio of the FM broadcast and television broadcast and receiving stereo sound and dual sound.

This receiver comprises an FM tuner, an FM audio/multiplexed-data processor, a TV tuner, and a TV audio/multiplexed-data processor. The FM tuner comprises an FM tuner 18 connected to an antenna 34 for both FM and TV.

The FM audio/multiplexed-data processor comprises an FM detector 19 connected to the FM tuner 18, an FM main/sub audio separator 20 connected to the FM detector 19, an FM sub audio demodulator 21 connected to the FM main/sub audio separator 20, an FM/TV stereo matrix circuit 35 connected to the FM main/sub audio separator 20 and to the FM sub audio demodulator 21, and speakers 13 connected to the FM/TV stereo matrix circuit 35.

A fourth band-pass filter allowing the sub-carrier for FM multiplexed data to pass is connected to the FM detector 19, an FM multiplexed data demodulator 27 is connected to the fourth band-pass filter 26, and an FM multiplexed data display unit 28 is connected to the FM multiplexed data demodulator 27.

The television tuner comprises a TV tuner 2 connected to the FM/TV antenna 34. The TV audio/multiplexed-data processor comprises a TV audio detector 8 connected to the TV tuner 2, a TV main/sub audio separator 9 connected to the TV audio detector 8, a TV sub audio demodulator 10 connected to the TV main/sub audio separator 9, an FM/TV stereo matrix circuit 35 connected to the TV main/sub audio separator 9 and the TV sub audio demodulator 10, and a TV dual sound circuit 12 connected to the TV sub audio demodulator 10. The TV dual sound circuit 12 is connected to speakers 13.

A first band-pass filter 14 allowing the first sub-carrier of 4.5 fH to pass and a second band-pass filter 31 allowing the second sub-carrier of 7.5 fH to pass are connected to the TV audio detector 8. A first TV multiplexed data demodulator 36 is connected to the first band-pass filter 14, a second TV multiplexed data demodulator 37 is connected to the second band-pass filter 31, and TV multiplexed data display units 38 and 39 are connected to the first TV multiplexed data demodulator 36 and the second TV multiplexed data demodulator 37, respectively. A printer for printing the TV multiplexed data may be used instead of or together with the TV multiplexed data display units 38 and 39.

In this receiver, the FM broadcast signal received by the FM/TV antenna 34 is tuned and selected by the FM tuner 18. The audio signal thus tuned and selected is detected by the FM detector 19 and is separated into a main audio signal and a sub audio signal by the FM main/sub audio separator 20.

Stereo audio is picked up from the main audio signal and the sub audio signal by the FM/TV stereo matrix circuit 35, and these audio signals are converted to sound at the speakers 13.

The sub-carrier for FM data multiplexed on the audio signal is selected by the fourth band-pass filter 26 as it passes through, and the sub-carrier for FM data selected by the fourth band-pass filter 26 is sent to the FM multiplexed data demodulator 27. FM multiplexed data is demodulated from the sub-carrier sent through at the FM multiplexed data demodulator 27, and the demodulated FM multiplexed data is displayed on the FM multiplexed data display unit 28.

The audio signal is tuned on the television broadcast signal received by the FM/TV antenna 34 and selected by the TV tuner 2. The audio signal thus tuned and selected is detected by the TV audio detector 8 and is separated into a main audio signal and a sub audio signal at the TV main/sub audio separator 9. In case the sub audio is stereo, the stereo audio is picked up from the main audio signal and the sub audio signal demodulated by the TV sub audio demodulator 10 by the FM/TV stereo matrix circuit 35. In case the demodulated sub audio is a TV dual sound, the sub audio signal demodulated by the TV sub audio demodulator 10 is picked up via the TV dual sound circuit 12. These audio signals are converted to sound at the speakers 13.

The first sub-carrier of 4.5 fH multiplexed on the TV audio signal is selected by the first band-pass filter 14 as it passes through, and the first sub-carrier selected by the first band-pass filter 14 is sent to the first TV multiplexed data demodulator 36. TV multiplexed data is demodulated from the first sub-carrier at the first TV multiplexed data demodulator 36, and the demodulated TV multiplexed data is displayed on the TV multiplexed data display unit 38.

The second sub-carrier of 7.5 fH multiplexed on the TV audio signal is selected by the second band-pass filter 31 as it passes through, and the second sub-carrier selected by the second band-pass filter 31 is sent to the second TV multiplexed data demodulator 37. TV multiplexed data is demodulated from the second sub-carrier at the second TV multiplexed data demodulator 37, and the demodulated TV multiplexed data is displayed on the TV multiplexed data display unit 39.

In this embodiment, two TV multiplexed data display units 38 and 39 are used, so that one TV multiplexed data display unit may be used at a time by switching over or the data may be displayed on both TV multiplexed data display units at the same time.

Figure 28:
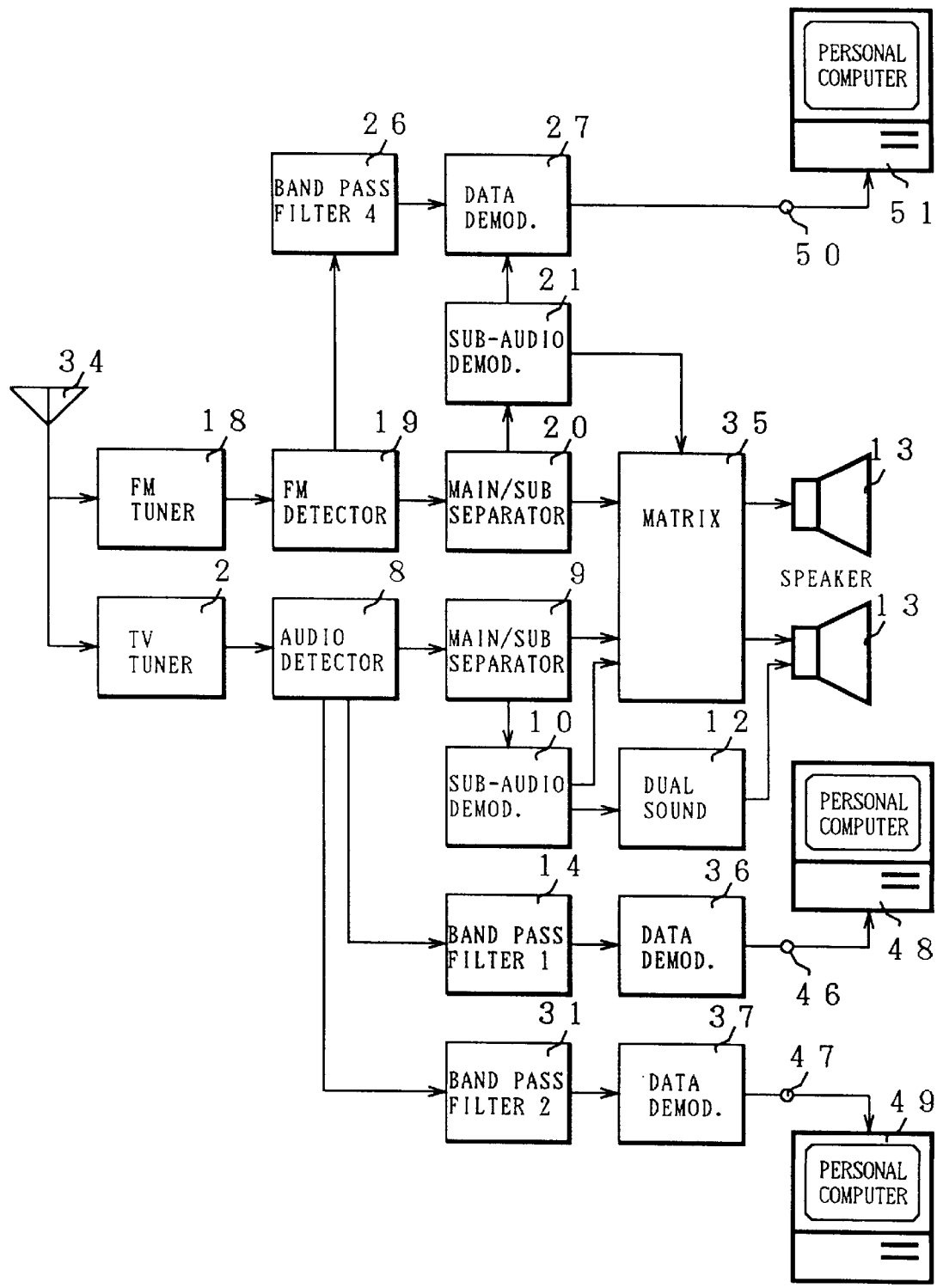
FIG. 28 is a block diagram of a receiver of an embodiment of the present invention for outputting FM multiplexed data and two-channel TV multiplexed data to a data processing device.

In the receiver shown in FIG. 27, the received FM multiplexed data is displayed on the FM multiplexed data display unit 28, and the two-channel TV multiplexed data is displayed on the first TV multiplexed data display unit 38 and the second TV multiplexed data display unit 39. In contrast, the receiver shown in FIG. 28 is designed in such manner that FM multiplexed data and TV multiplexed data which are received can be outputted to a data processing device such as a personal computer. Therefore, in case the receiver of FIG. 28 is used, it is possible to store the received multiplexed data and to utilize it again, or to edit the received multiplexed data, when necessary.

The basic arrangement of this television receiver is the same as that of the television receiver shown in FIG. 27. Thus, a description is not given here for features common to both, but only differences will be described. Specifically, a first TV multiplexed data demodulator 36 is connected to the first band-pass filter 14 of the TV tuner, the first TV multiplexed data demodulator 36 is provided with a connection terminal 46 instead of the TV multiplexed data display unit 38 of FIG. 27, and a personal computer 48 is connected to the connection terminal 46. Also, a second TV multiplexed data demodulator 37 is connected to the second band-pass filter of the TV tuner, the second TV multiplexed data demodulator 37 is provided with a connection terminal 47 instead of the TV multiplexed data display unit 39 of FIG. 27, and a personal computer 49 is connected to the connection terminal 47. An FM multiplexed data demodulator 27 is connected to the fourth band-pass filter 26 of the FM tuner, the FM multiplexed data demodulator 27 is provided with a connection terminal 50 instead of the FM multiplexed data display unit 28 of FIG. 24, and a personal computer 51 is connected to the connection terminal 50.

The personal computers 48, 49 and 51 shown here are given merely as examples, and other devices, such as PDA (personal digital assistants), electronic notebooks, word processors, and the like, which can process data, may be connected.

Figure 29:
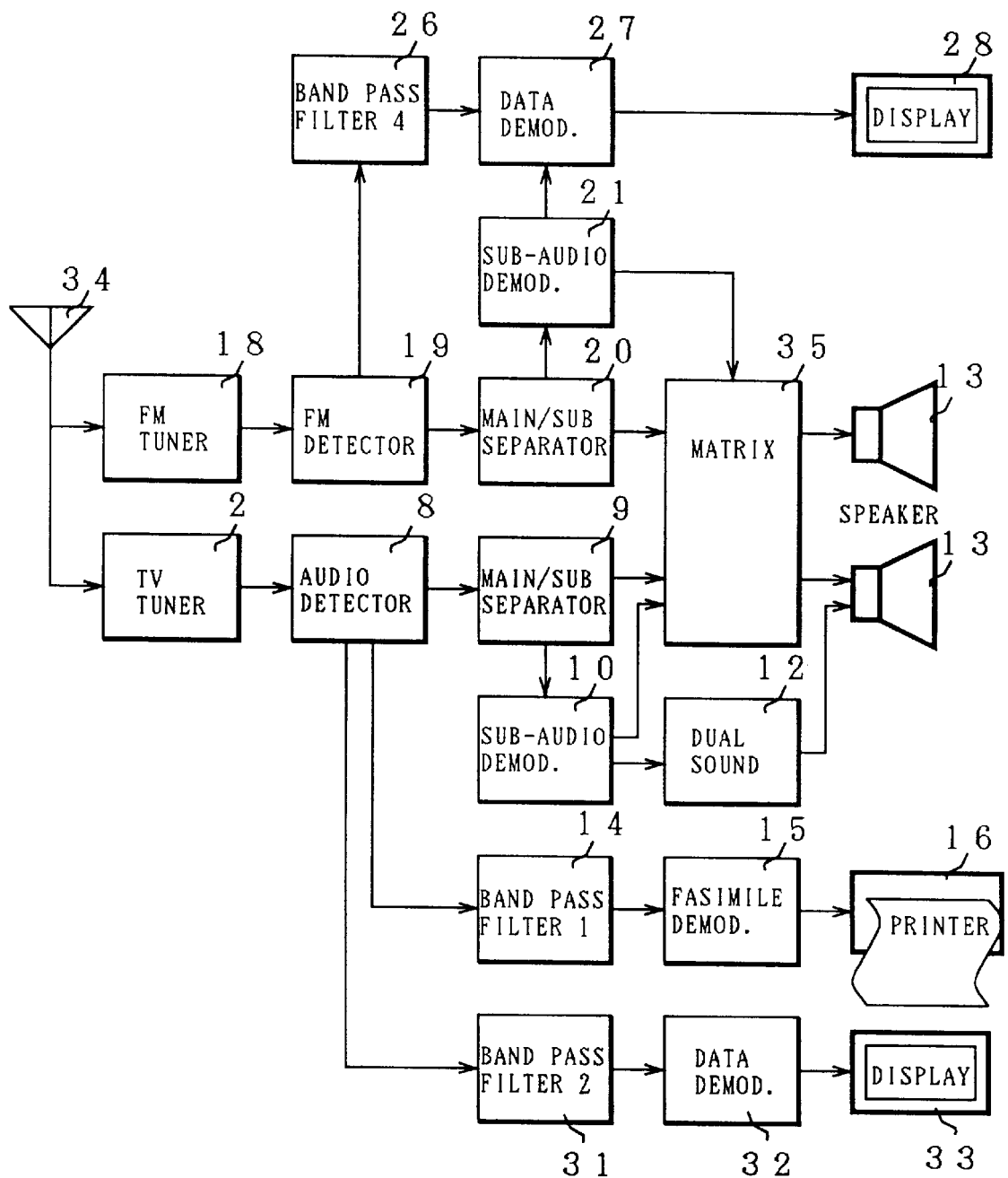
FIG. 29 is a block diagram of a receiver of an embodiment of the present invention for receiving FM multiplexed data and one-channel TV multiplexed facsimile as well as one-channel TV multiplexed data.

FIG. 29 represents another block diagram of a receiver for receiving one-channel TV multiplexed facsimile data and one-channel TV multiplexed data using a first sub-carrier of 4.5 fH and a second sub-carrier of 7.5 fH in addition to receiving the audio of FM broadcast and television broadcast and to receiving stereo sound and dual sound. This receiver is provided with functions to demodulate and print one-channel TV multiplexed facsimile data using the first sub-carrier of 4.5 fH and to demodulate and display one-channel TV multiplexed data using the second sub-carrier of 7.5 fH instead of the functions to demodulate and print the two-channel TV multiplexed facsimile data using the first sub-carrier of 4.5 fH and the second sub-carrier of 7.5 fH shown in FIG. 27.

This receiver comprises an FM tuner, an FM audio/multiplexed-signal processor, a TV tuner and a TV audio/multiplexed-signal processor. Among these component elements, the arrangement and operation of the FM tuner and the processing of the FM stereo sound, as well as the arrangement and operation of the TV tuner and the processing of the TV stereo sound and the TV dual sound, are the same as those of the receiver shown in FIG. 24; accordingly, a detailed description is not given here.

A fourth band-pass filter 26 allowing the sub-carrier for FM multiplexed data to pass is connected to the FM detector 19, an FM multiplexed data demodulator 27 is connected to the fourth band-pass filter 26, and an FM multiplexed data display unit 28 is connected to the FM multiplexed data demodulator 27. A first band-pass filter 14 allowing the first sub-carrier of 4.5 fH to pass and a second band-pass filter 31 allowing the second sub-carrier of 7.5 fH to pass are connected to the TV audio detector 8. A TV multiplexed facsimile data demodulator 15 is connected to the first band-pass filter 14, a TV multiplexed data demodulator 32 is connected to the second band-pass filter 31, a TV multiplexed facsimile data printer 16 is connected to the TV multiplexed facsimile data demodulator 15, and a TV multiplexed data display unit 33 is connected to the TV multiplexed data demodulator 32. A display unit for displaying TV multiplexed facsimile data may be used instead of or together with the TV multiplexed facsimile data printer 16. Also, a printer for printing TV multiplexed data may be used instead of or together with the TV multiplexed data display unit 33.

The sub-carrier for FM data multiplexed on the audio signal is selected by the fourth band-pass filter 26 as it passes through, and the sub-carrier for FM data selected by the fourth band-pass filter 26 is sent to the FM multiplexed data demodulator 27. FM multiplexed data is demodulated from the sub-carrier at the FM multiplexed data demodulator 27, and the demodulated FM multiplexed data is displayed on the FM multiplexed data display unit 28. The first sub-carrier of 4.5 fH multiplexed on the TV audio signal is selected by the first band-pass filter 14, and the first sub-carrier selected by the first band-pass filter 14 is sent to the TV multiplexed facsimile data demodulator 15. TV multiplexed facsimile data is demodulated from the first sub-carrier at the TV multiplexed facsimile data demodulator 15, and the demodulated TV multiplexed facsimile data is printed by the TV multiplexed facsimile data printer 16.

The second sub-carrier of 7.5 fH multiplexed on the TV audio signal is selected by the second band-pass filter 31 as it passes through, and the second sub-carrier selected by the second band-pass filter 31 is sent to the TV multiplexed data demodulator 32. TV multiplexed data is demodulated from the second sub-carrier at the TV multiplexed data demodulator 32, and the demodulated TV multiplexed data is displayed on the TV multiplexed data display unit 33.

In the embodiment shown in FIG. 29, the FM multiplexed data display unit 28 and the TV multiplexed data display unit 33 are used, so that one data display unit may be used at time by switching over or the data may be displayed at the same time. In case the data multiplexed in the FM broadcast is facsimile data, a third band-pass filter 23, an FM multiplexed facsimile data demodulator 24 and an FM multiplexed facsimile data printer 25 may be used instead of the fourth band-pass filter 26, the FM multiplexed data demodulator 27 and the FM multiplexed data display unit 28.

Figure 30:
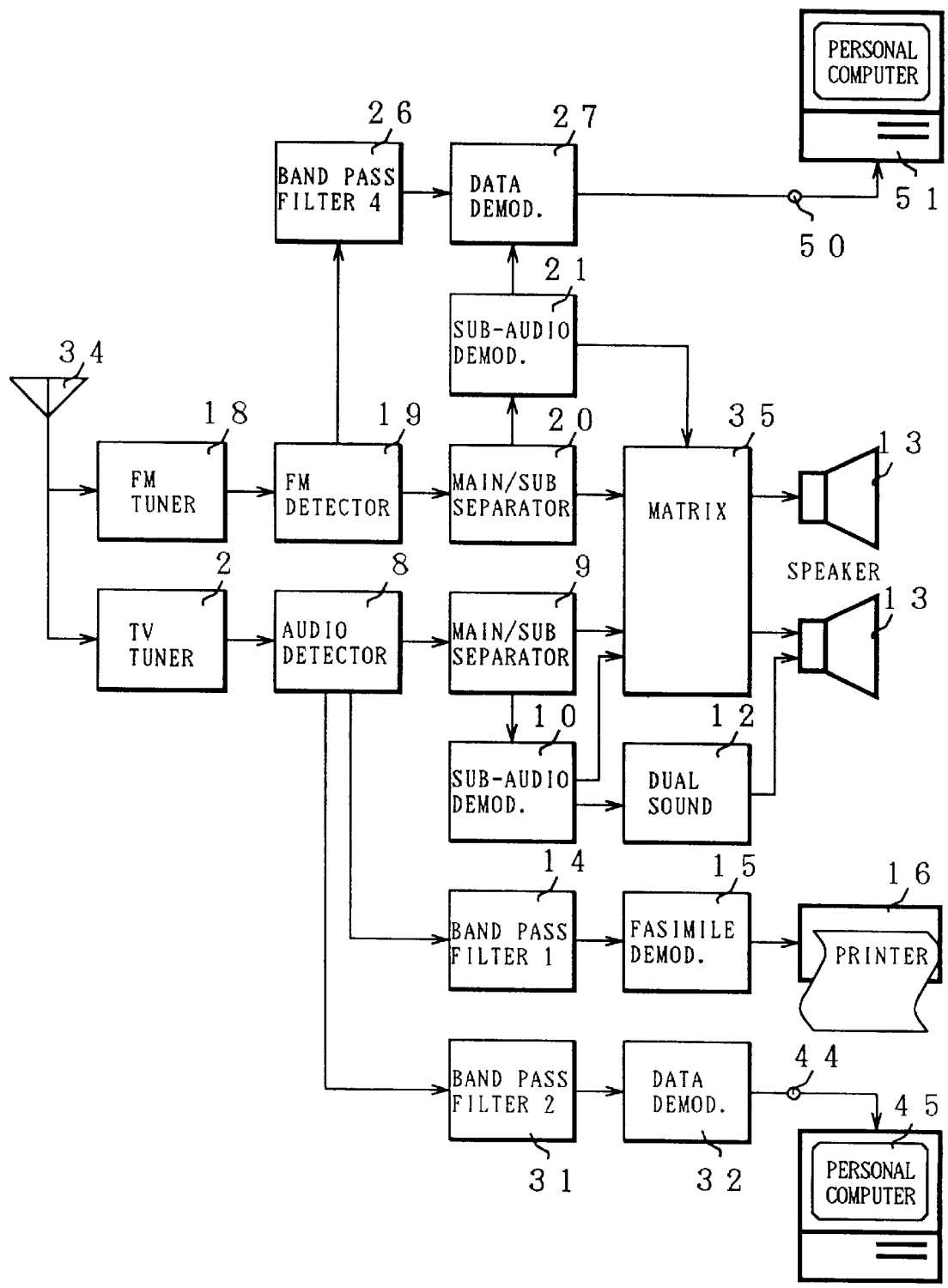
FIG. 30 is a block diagram of a receiver of an embodiment of the present invention for receiving one-channel TV multiplexed facsimile and for outputting FM multiplexed data and one-channel TV multiplexed data to a data processing device.

In the receiver shown in FIG. 29, the received FM multiplexed data is displayed on the FM multiplexed data display unit 28, and the TV multiplexed data is displayed on the TV multiplexed data display unit 33. In contrast, the receiver shown in FIG. 30 is designed in such manner that FM multiplexed data and TV multiplexed data can be outputted to a data processing unit such as a personal computer. Therefore, in case the receiver shown in FIG. 30 is used, it is possible to store the received multiplexed data and to utilize it again, or to edit the received multiplexed data, when necessary.

The basic arrangement of this television receiver is the same as that of the television receiver shown in FIG. 29. Thus, a detailed description is not given on features common to both, but only differences will be described. Specifically, a TV multiplexed data demodulator 32 is connected to the second band-pass filter 31 of the TV tuner. The TV multiplexed data demodulator 32 is provided with a connection terminal 44 instead of the TV multiplexed data display unit 33 of FIG. 29, and a computer 45 is connected to the connection terminal 44. An FM multiplexed data demodulator 27 is connected to the fourth band-pass filter 26 of the FM tuner. The FM multiplexed data demodulator 27 is provided with a connection terminal 50 instead of the FM multiplexed data display unit 28, and a personal computer 51 is connected to the connection terminal 50. The personal computers 45 and 51 shown here are given merely as examples, and other devices, such as PDA (personal digital assistants), electronic notebooks, word processors, and the like, which can process data, may be connected.

A description has been given above of embodiments in which a teletext signal multiplexed on a video signal and stereo sound and dual sound multiplexed on an audio signal are all reproduced, whereas it is obvious that the functions can be equivalently reduced or switched over.

We claim:

1. A receiver for multiplex broadcasting for receiving multiplex broadcast by multiplexing two-channel data to a sub-carrier of 4.5 fH and a sub-carrier of 7.5 fH of a broadcasting sub audio band of a television broadcasting wave that comprises a video band, a main audio band and a sub audio band, said receiver comprising:

a first device for demodulating data multiplexed on said sub-carrier of 4.5 fH; and a second device for demodulating data multiplexed on said sub-carrier of 7.5 fH.

2. A receiver for multiplex broadcasting according to claim 1, further comprising a third device for demodulating a teletext broadcasting signal multiplexed on a scanning line in a vertical blanking interval of a video signal.

3. A receiver for multiplex broadcasting according to claim 1, further comprising a fourth device for demodulating data multiplexed on a sub audio band of an FM broadcasting wave that comprises a main audio band and said sub audio band.

4. A receiver for multiplex broadcasting according to claims 1, 2, or 3, further comprising a display unit for displaying demodulated data from said first, second, or fourth device or a demodulated teletext signal from said third device.

5. A receiver for multiplex broadcasting according to claims 1, 2, or 3, further comprising a printer for printing demodulated data from said first, second, or fourth device or a demodulated teletext signal from said third device.

6. A receiver for multiplex broadcasting according to claims 1, 2, or 3, further comprising a signal output unit for outputting demodulated data from said first, second, or fourth device or a demodulated teletext signal from said third device.

7. A receiver for multiplex broadcasting according to claims 1, 2, or 3, further comprising a TV picture display unit for displaying television pictures and a speaker for converting an audio signal to sound.

8. A receiver for multiplex broadcasting according to claim 4, further comprising a TV picture display unit for displaying television pictures and a speaker for converting an audio signal to sound.

9. A receiver for multiplex broadcasting according to claim 5, further comprising a TV picture display unit for displaying television pictures and a speaker for converting an audio signal to sound.

10. A receiver for multiplex broadcasting according to claim 6, further comprising a TV picture display unit for displaying television pictures and a speaker for converting an audio signal to sound.

11. A receiver for multiplex broadcasting for receiving multiplex broadcast by multiplexing two-channel data to a sub-carrier of 4.5 fH and a sub-carrier of 7.5 fH of a broadcasting sub audio band of a television broadcasting wave that comprises a video band, a main audio band and a sub audio band, said receiver comprising a first device for demodulating data multiplexed on said sub-carrier of 7.5 fH.

12. A receiver for multiplex broadcasting according to claim 11, further comprising a second device for demodulating a teletext broadcasting signal multiplexed on a scanning line in a vertical blanking interval of a video signal.

13. A receiver for multiplex broadcasting according to claim 11, further comprising a third device for demodulating data multiplexed on a sub audio band of an FM broadcasting wave that comprises a main audio band and said sub audio band.

14. A receiver for multiplex broadcasting according to claims 11, 12, or 13, further comprising a display unit for displaying demodulated data from said first or third device or a demodulated teletext signal from said second device.

15. A receiver for multiplex broadcasting according to claims 11, 12, or 13, further comprising a printer for printing demodulated data from said first or third device or a demodulated teletext signal from said second device.

16. A receiver for multiplex broadcasting according to claims 11, 12, or 13, further comprising a signal output unit for outputting demodulated data from said first or third device or a demodulated teletext signal from said second device.

17. A receiver for multiplex broadcasting according to claims 11, 12, or 13, further comprising a TV picture display unit for displaying television pictures and a speaker for converting an audio signal to sound.

18. A receiver for multiplex broadcasting according to claim 14, further comprising a TV picture display unit for displaying television pictures and a speaker for converting an audio signal to sound.

19. A receiver for multiplex broadcasting according to claim 15, further comprising a TV picture display unit for displaying television pictures and a speaker for converting an audio signal to sound.

20. A receiver for multiplex broadcasting according to claim 16, further comprising a TV picture display unit for displaying television pictures and a speaker for converting an audio signal to sound.

21. A receiver for multiplex broadcasting for receiving multiplex broadcast by multiplexing data to a sub-carrier of 7.5 fH of a broadcasting sub audio band of a television broadcasting wave that comprises a video band, a main audio band and a sub audio band, said receiver comprising a first device for demodulating data multiplexed on said sub-carrier of 7.5 fH.

22. A receiver for multiplex broadcasting according to claim 21, further comprising a second device for demodulating a teletext broadcasting signal multiplexed on a scanning line in a vertical blanking interval of a video signal.

23. A receiver for multiplex broadcasting according to claim 21, further comprising a third device for demodulating data multiplexed on a sub audio band of an FM broadcasting wave that comprises a main audio band and said sub audio band.

24. A receiver for multiplex broadcasting according to claims 21, 22, or 23, further comprising a display unit for displaying demodulated data from said first or third device or a demodulated teletext signal from said second device.

25. A receiver for multiplex broadcasting according to claims 21, 22, or 23, further comprising a printer for printing demodulated data from said first or third device or a demodulated teletext signal from said second device.

26. A receiver for multiplex broadcasting according to claims 21, 22, or 23, further comprising a signal output unit for outputting demodulated data from said first or third device or a demodulated teletext signal from said second device.

27. A receiver for multiplex broadcasting according to claims 21, 22, or 23, further comprising a TV picture display unit for displaying television pictures and a speaker for converting an audio signal to sound.

28. A receiver for multiplex broadcasting according to claim 24, further comprising a TV picture display unit for displaying television pictures and a speaker for converting an audio signal to sound.

29. A receiver for multiplex broadcasting according to claim 25, further comprising a TV picture display unit for displaying television pictures and a speaker for converting an audio signal to sound.

30. A receiver for multiplex broadcasting according to claim 26, further comprising a TV picture display unit for displaying television pictures and a speaker for converting an audio signal to sound.

31. A receiver for multiplex broadcasting according to claim 10, wherein said TV picture display unit further comprises a TV format converter for displaying said demodulated data or said demodulated teletext signal.

32. A receiver for multiplex broadcasting according to claim 20, wherein said TV picture display unit further comprises a TV format converter for displaying said demodulated data or said demodulated teletext signal.

33. A receiver for multiplex broadcasting according to claim 30, wherein said TV picture display unit further comprises a TV format converter for displaying said demodulated data or said demodulated teletext signal.

34. A multiplex method of broadcasting a sub audio band of a television broadcasting wave that includes a video band, a main audio band and a sub audio band, comprising the step of multiplexing data to a sub-carrier of 7.5 fH of said television broadcasting wave.

35. The method of claim 34, further including the step of multiplexing data to a sub-carrier of 4.5 fH of said sub audio band.

36. The method of claims 34 or 35, wherein said sub-carrier of 7.5 fH is modulated by multi-valued digital modulation within a frequency deviation of ±30 KHz.

37. A receiver for multiplex broadcasting of a television broadcasting wave that includes a video band, a main audio band and a sub audio band, said receiver comprising a device for demodulating data multiplexed on a sub-carrier of 7.5 fH of said sub audio band.

\* \* \* \* \*